(12) United States Patent
He et al.

(10) Patent No.: US 11,985,659 B2
(45) Date of Patent: May 14, 2024

(54) CONTROL CHANNEL AND REFERENCE SIGNAL TRANSMISSION IN WIRELESS NETWORKS

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Huaning Niu, San Jose, CA (US); Jie Cui, San Jose, CA (US); Oghenekome Oteri, San Diego, CA (US); Seyed Ali Akbar Fakoorian, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 320 days.

(21) Appl. No.: 17/440,660

(22) PCT Filed: Apr. 5, 2021

(86) PCT No.: PCT/CN2021/085512
§ 371 (c)(1),
(2) Date: Sep. 17, 2021

(87) PCT Pub. No.: WO2022/213235
PCT Pub. Date: Oct. 13, 2022

(65) Prior Publication Data
US 2023/0128513 A1   Apr. 27, 2023

(51) Int. Cl.
*H04W 72/1273* (2023.01)
*H04L 5/00* (2006.01)
*H04W 24/08* (2009.01)
*H04W 72/20* (2023.01)

(52) U.S. Cl.
CPC ....... *H04W 72/1273* (2013.01); *H04L 5/0051* (2013.01); *H04W 24/08* (2013.01); *H04W 72/20* (2023.01)

(58) Field of Classification Search
CPC . H04W 72/1273; H04W 24/08; H04W 72/20; H04L 5/0051; H04L 5/0053; H04L 5/0094; H04L 5/001; H04L 1/1893; H04L 5/0048
See application file for complete search history.

(56) References Cited

U.S. PATENT DOCUMENTS

2017/0353254 A1* 12/2017 Islam .................... H04L 5/0023
2018/0026684 A1*  1/2018 Wei ...................... H04L 5/0007
                                                           370/329
(Continued)

FOREIGN PATENT DOCUMENTS

CN    101867403    10/2010
CN    107959560     4/2018
(Continued)

OTHER PUBLICATIONS

3GPP TS 38.214 V16.5.0, 3rd Generation Partnership Project, Technical Specification Group Radio Access Network; NR; Physical layer procedures for data (Release 16), Mar. 2021, 171 pages.

(Continued)

*Primary Examiner* — Kyaw Z Soe
(74) *Attorney, Agent, or Firm* — Kilpatrick Townsend & Stockton LLP

(57) ABSTRACT

The present application relates to devices and components including apparatus, systems, and methods for control signaling and reference signal transmission in wireless networks.

19 Claims, 23 Drawing Sheets

(56) References Cited

U.S. PATENT DOCUMENTS

| | | | |
|---|---|---|---|
| 2020/0221428 A1 | 7/2020 | Moon et al. | |
| 2021/0274477 A1* | 9/2021 | Yi | H04W 76/27 |
| 2023/0117080 A1* | 4/2023 | Lei | H04L 5/0012 |
| | | | 370/329 |

FOREIGN PATENT DOCUMENTS

| | | |
|---|---|---|
| CN | 111357228 | 6/2020 |
| CN | 111869300 | 10/2020 |
| CN | 112514309 | 3/2021 |

OTHER PUBLICATIONS

3GPP TS 38.331 V16.4.1, 3rd Generation Partnership Project, Technical Specification Group Radio Access Network; NR; Radio Resource Control (RCC) protocol specification (Release 16), Mar. 2021, 949 pages.

Discussion on SCell PDCCH Scheduling P(S)Cell PDSCH or PUSCH, Huawei, 3GPP TSG RAN WGI Meeting #104e, R1-2100193, Feb. 5, 2021, 6 pages.

International Patent Application No. PCT/CN2021/085512, International Search Report and Written Opinion, dated Jan. 12, 2022, 12 pages.

New WID on NR Dynamic spectrum sharing (DSS), Ericsson, 3GPP TSG RAN Meeting #86, RP-193260, Dec. 9-12, 2019, 4 pages.

3rd Generation Partnership Project; Technical Specification Group Radio Access Network; NR; Multiplexing and channel coding (Release 16), 3GPP TS 38.212 V16.5.0, Mar. 2021, 152 pages.

3rd Generation Partnership Project; Technical Specification Group Radio Access Network; NR; Physical layer procedures for control (Release 16), 3GPP TS 38.213 V16.5.0, Mar. 2021, 184 pages.

International Patent Application No. PCT/CN2021/085512, International Preliminary Report on Patentability, Oct. 19, 2023, 7 pages.

* cited by examiner

CONTROL CHANNEL AND REFERENCE SIGNAL TRANSMISSION IN WIRELESS NETWORKS

CROSS-REFERENCES TO RELATED APPLICATIONS

This application is a U.S. National Stage Application of PCT/CN2021/085512 filed Apr. 5, 2021. The disclosure of which is herein incorporated by reference in its entirety for all purposes.

BACKGROUND

Third Generation Partnership Project (3GPP) Technical Specifications (TSs) define standards for wireless networks. These TSs describe aspects related to control channels and reference signals that may be transmitted in the wireless networks.

DETAILED DESCRIPTION

Figure 1:
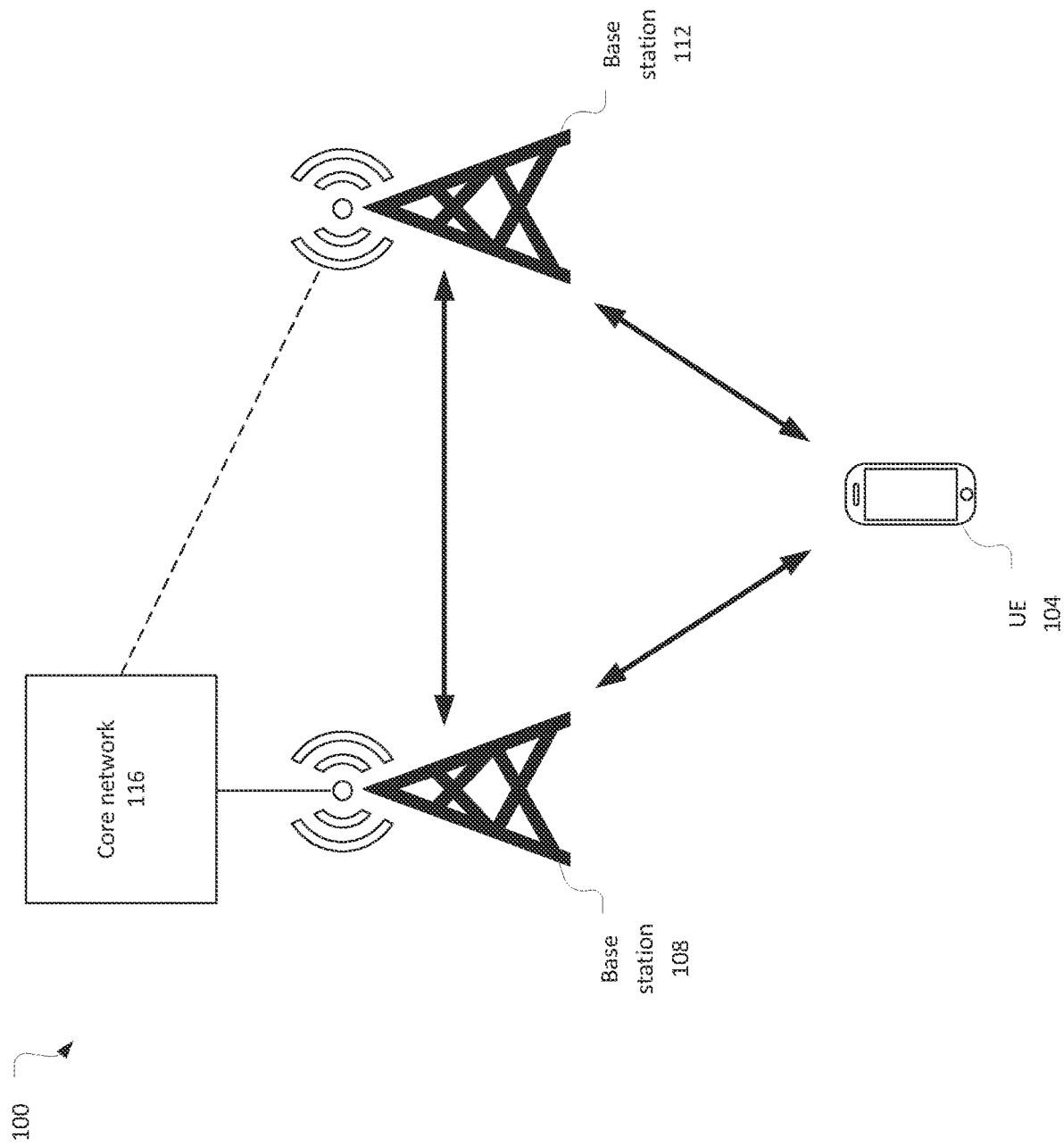
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 communicatively coupled with one or more base station such as, for example, base station 108 and base station 112. The UE 104 and the base stations 108/112 may communicate over air interfaces compatible with 3GPP TSs such as those that define Long Term Evolution (LTE) and Fifth Generation (5G) new radio (NR) system standards. The base stations 108/112 may be an evolved node B (eNB) to provide one or more Long Term Evolution (LTE) evolved universal terrestrial radio access (E-UTRA) cells to provide E-UTRA user plane and control plane protocol terminations toward the UE 104; or next generation node B (gNB) to provide one or more 5G New Radio (NR) cells to provide NR user plane and control plane protocol terminations toward the UE 104.

Each of the base stations 108/112 may provide one or more cells using a carrier aggregation (CA) deployment. In carrier aggregation, a base station may provide a primary serving cell (PCell) to provide some or all of the control signaling through signaling radio bearers (SRBs) and one or more secondary serving cells (SCells) to provide one or more data radio bearers (DRBs) to increase throughput capability of the system. A PCell may be configured on a primary component carrier (PCC) and the SCells may be configured on secondary component carriers (SCCs).

In some embodiments, the network environment 100 may support dual connectivity (DC) operation in which the UE 104 may be configured to utilize radio resources provided by distinct schedulers located in different base stations 108/112. One of the base stations may be configured as a master node (MN) to provide a control plane connection to the core network 116. The MN may be associated with the group of serving cells referred to as a master cell group (MCG), which includes a PCell and optionally one or more SCells in a CA deployment. The other base station may be configured as a secondary node (SN), which may not have a control plane connection to the core network 116. The SN may be used to provide additional resources to the UE 104. The SN may be associated with a group of serving cells referred to as a secondary cell group (SCG), which includes a primary cell (PSCell) and one or more SCells in a CA deployment. The primary cells of DC network (for example, PCells and PSCells) may be referred to as special cells (SpCells).

NR networks may utilize dynamic spectrum sharing (DSS) that allow LTE and NR to share the same carrier. The DSS framework allows an NR cell to rate match around LTE reference signals that would otherwise cause strong interference and compromise spectral efficiencies. Physical downlink control channel PDCCH enhancements for cross carrier scheduling may be considered for improving DSS operation. The PDCCH of an SCell may be used to schedule PDSCH or PUSCH on a PCell or PSCell. When this is configured, the SCell may be referred to as a scheduling SCell (sScell). Further study may be needed to determine whether to specify PDCCH of PCell/PSCell/SCell scheduling PDSCH on multiple cells using a single downlink control information (DCI). The number of cells that may be scheduled at one time may be limited to two in some scenarios. It may be desirable to minimize the increase in the size of DCI used to schedule PDSCH on multiple cells.

In some scenarios, it may be assumed that the UE 104 may monitor type 0/0A/1/2 common search space (CSS) sets (for DCI formats associated with those CSS sets) only on on PCell/PSCell and not on a sSCell. When cross carrier scheduling from an sSCell to PCell/PSCell is configured, the UE 104 can be configured to monitor DCI formats 0_1/1_1/0_2/1_2 that schedule PDSCH/PUSCH on PCell/PSCell on PCell/PSCell UE specific search space (USS) set(s), or on sSCell USS set(s).

Some embodiments describe how to configure the USS sets on PCell/PSCell and sSCell for cross carrier scheduling on PCell/PSCell; whether and how to switch the configured search space sets on PCell/PSCell and sSCell for PDCCH monitoring; and how to define the PDCCH overbooking as the PDCCH candidates may be located over two component carriers.

Embodiments describe various approaches for configuring USS search space sets on the sSCell and PCell/PSCell for PCell/PSCell. Different types of search space sets for PCell/PSCell may be defined depending on the component carrier where it is configured to transmit. A type-1 USS may be configured on the PCell/PSCell for the PCell/PSCell with self-scheduling operation. A type-2 USS may be configured on the sSCell for the PCell/PSCell with cross carrier scheduling (CCS) operation.

Figure 2:
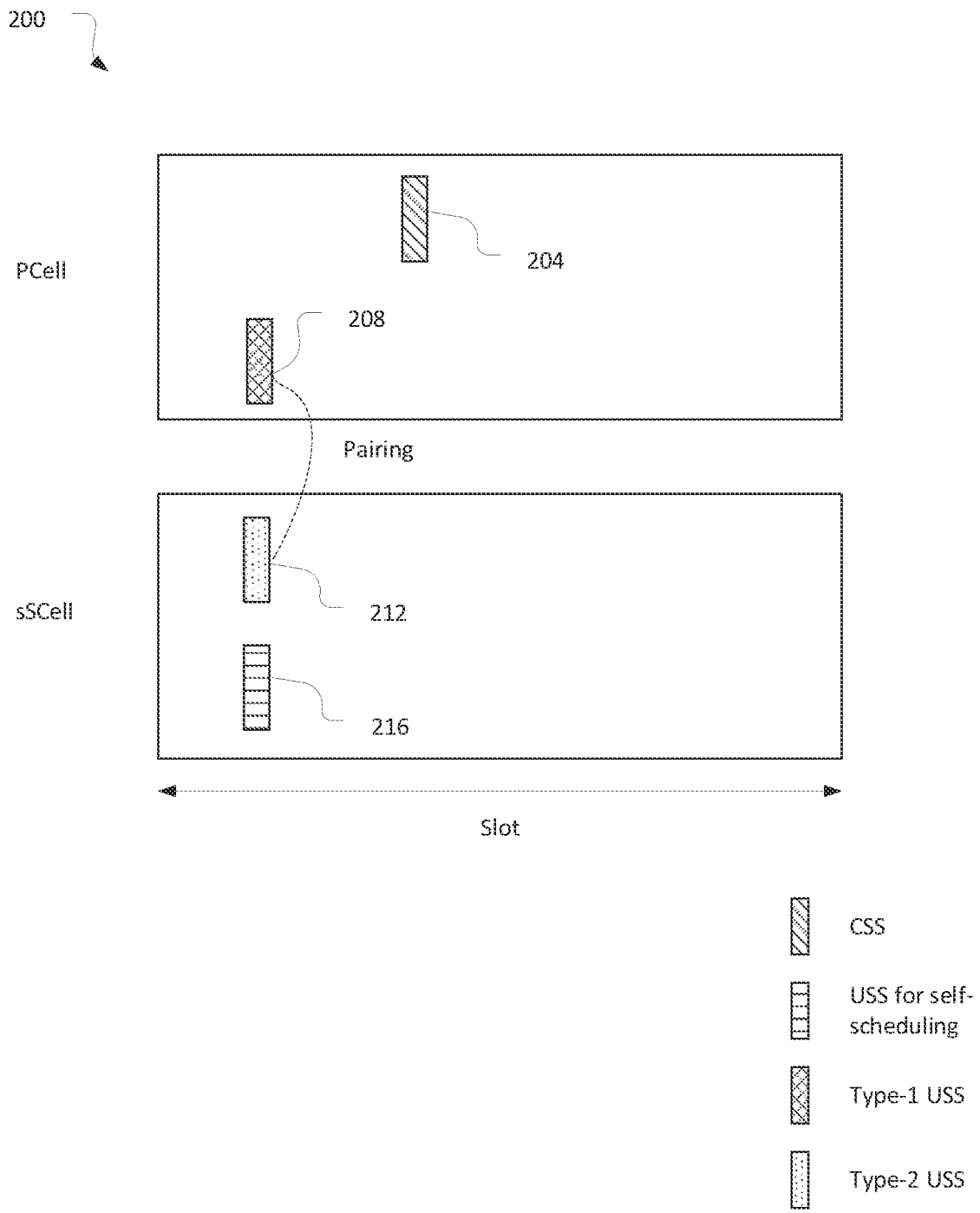
FIG. 2 illustrates transmission resources in accordance with some embodiments.

FIG. 2 illustrates transmission resources 200 in accordance with some embodiments. The transmission resources 200 may include a PCell (or PSCell) and an sSCell.

The PCell may include a CSS 204 and a type-1 USS. The CSS 204 may be used for broadcast messages or group-specific DCI. For example, the CSS 204 may be used for paging messages, system information, random access response, etc. The type-1 USS may be used to schedule PDSCH/PUSCH in the PCell.

The sSCell may include a type-2 USS 212 and a USS for self-scheduling 216. The type-2 USS 212 may be used to schedule PDSCH/PUSCH in the PCell. The USS for self-scheduling 216 may be used to schedule PDSCH/PUSCH in the sSCell.

In some embodiments, all of the configurable parameters of a search space may be identical or duplicated between type-1 USS and type-2 USS if they have a same search space set (SSS)-identifier (ID). For example, if the type-1 USS 208 and the type-2 USS 212 have a common SSS-ID, they may be paired with one another and have the same configurable parameters. The configurable parameters that may be the same between paired SSSs may include, for example, a control resource set (CORESET) index, duration, PDCCH blind decoding (BD) candidate numbers, DCI formats for monitoring, PDCCH monitoring periodicity and offset, and PDCCH monitoring span within a slot. In some embodiments, BD numbers may be different for type-1 and type-2 USS that are associated with a common SSS ID.

Providing the type-1/type-2 USSs with common configurable parameters may facilitate detecting/decoding PDCCH transmitted in these search spaces. For example, as shown in FIG. 2, the type-1 USS 208 and the type-2 USS 212 may be configured in the same symbols. This may make the detecting/decoding of PDCCH transmitted in the search spaces more efficient.

Providing the type-1/type-2 USSs with common configurable parameters may also facilitate configuration of these search spaces. For example only one of the type-1 USS or type-2 USS may need to be configured explicitly using a radio resource control (RRC) message. The explicitly configured USS may be the type-1 USS on the PCell/PSCell or the type-2 USS on the sSCell. There may be no need to explicitly configure the associated USS as it may be configured by association. In some embodiments, a one bit flag information element (TE) may be added for a type-1 or type-2 USS to indicate the presence of the associated USS of the other type.

An exemplary abstract syntax notation one (ANS.1) code to configure a search space with a flag to indicate the presence of an associated USS may be shown as follows.

```
SearchSpace ::= SEQUENCE {
    searchSpaceID              SearchSpaceID
    controlResourceSetID       ControlResourceSetId
    OPTIONAL,                  -- Cond SetupOnly
    Type2-USS-Presence         BOOLEAN
    OPTIONAL,                  -- Cond PCell/PSCell only
```

This IE may be present in the PCell/PSCell configuration. The Type2-USS-Presence field may be used to indicate whether Type-2 USS is present (value true) or not (value false) on the sSCell indicating a grant or assignment for this PCell or PSCell.

In some embodiments, a search space configuration may include a PCell/PSCell only field. This field may be present in a USS of a PCell/PSCell. If the USS is not a PCell/PSCell, it may be absent.

The above search space configuration may be used to initially configure a Type-1 USS on a PCell/PSCell and indicate presence of an associated type-2 USS on the sSCell by setting the 1-bit flag Type2-USS-Presence to be 'true.' The type-2 USS may then be configured based on configuration parameters for the type-1 USS. In other embodiments, a search space configuration may be used to first configure a Type-2 USS and indicate presence of a type-1 USS, which may then be configured by association.

Figure 3:
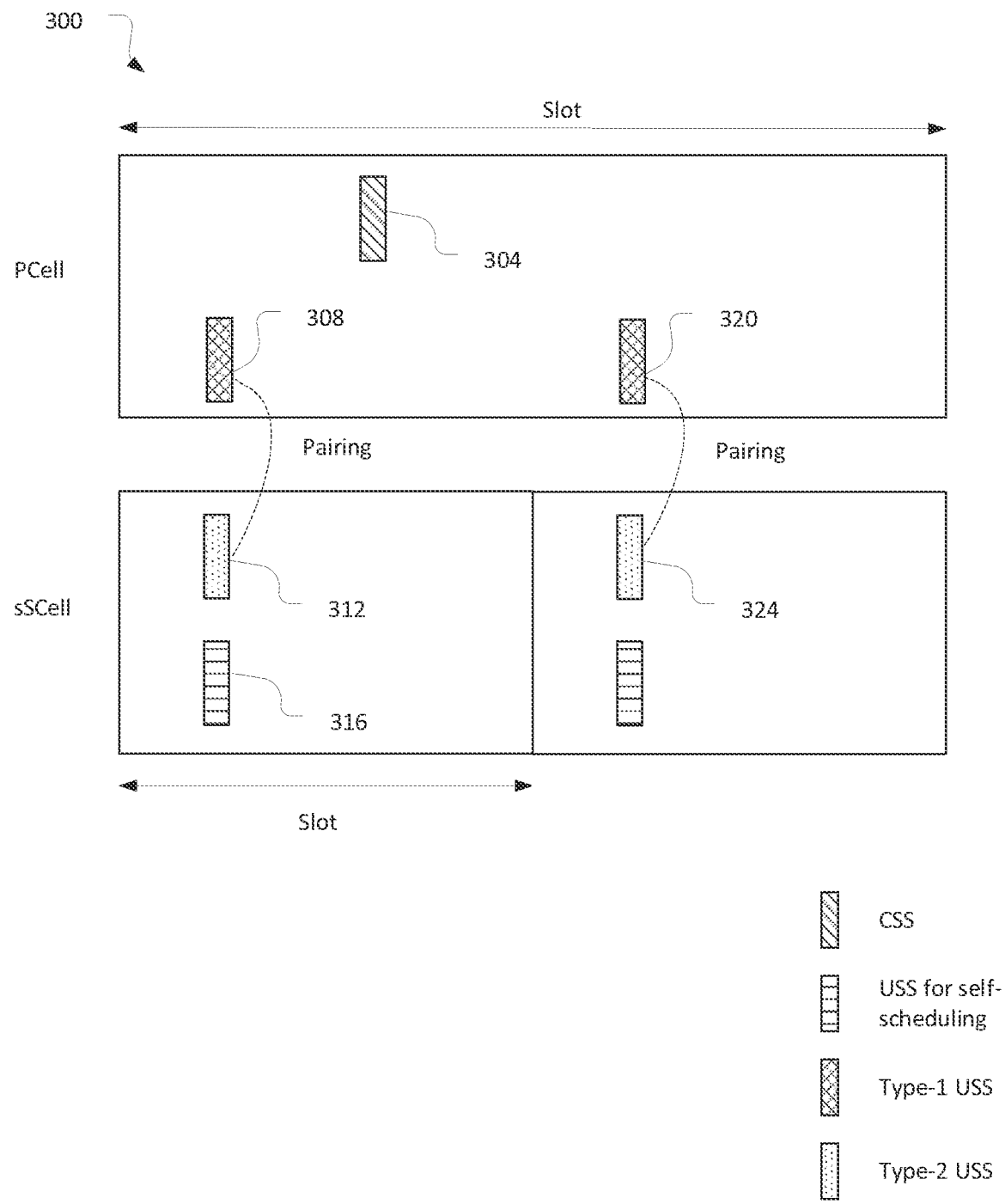
FIG. 3 illustrates transmission resources in accordance with some embodiments.

FIG. 3 illustrates transmission resources 300 in accordance with some embodiments. In this embodiment, the PCell may include a first numerology while the sSCell includes a second numerology. For example, the PCell may include a 15 kHz subcarrier spacing (SCS) while the sSCell includes a 30 kHz SCS. Thus, the slot of the sSCell may be half the length of the slot of the PCell.

The PCell may include a CSS 304 and a type-1 USS 308 and the sSCell may include a type-2 USS 312 and a USS for self-scheduling 316 similar to that described above with respect to FIG. 2. However, in order to maintain alignment between the type-1 USSs and the type-2 USSs, the PCell may include an additional type-1 USS 320 that is associated with the type-2 USS 324 in the second slot of the sSCell.

Figure 4:
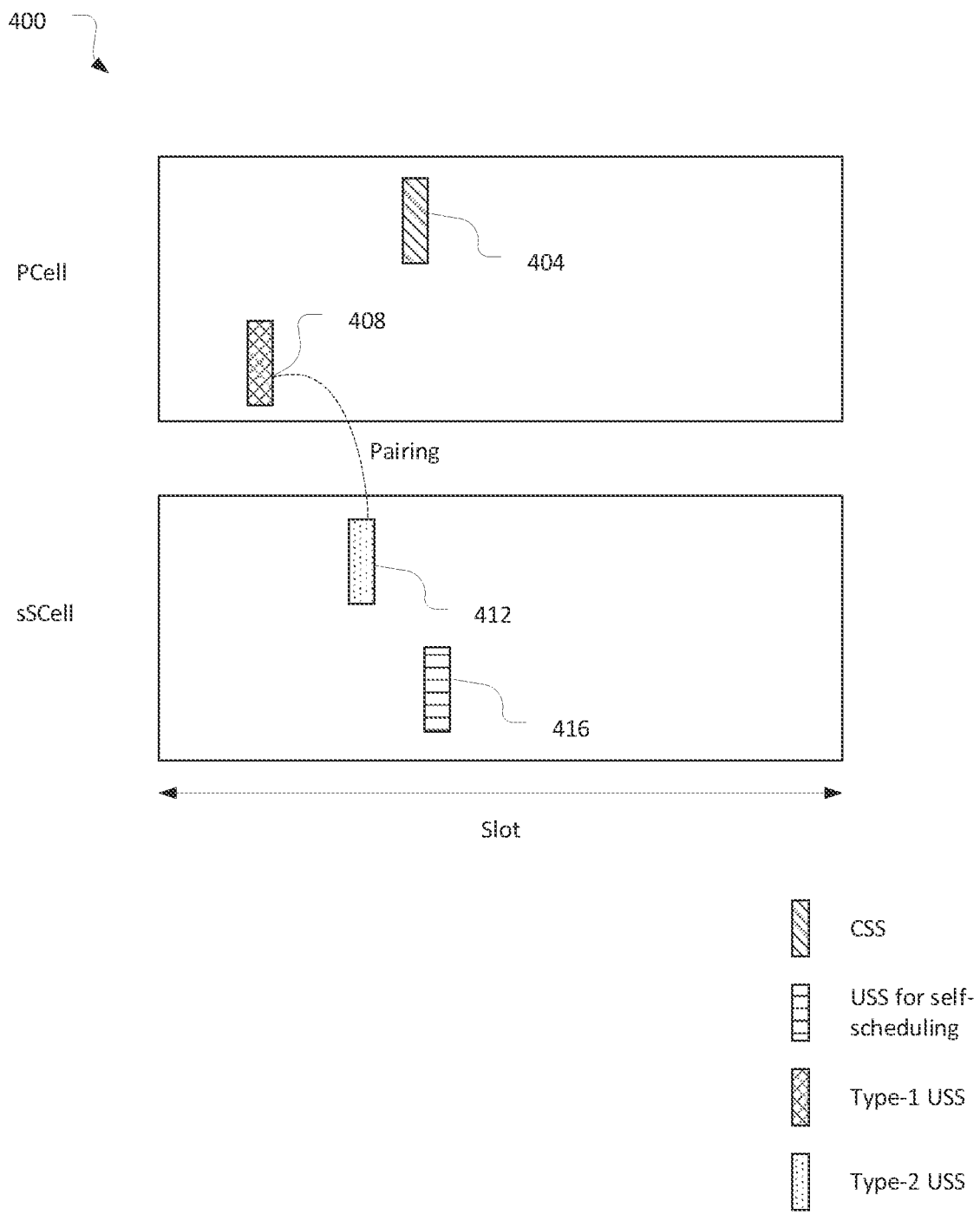
FIG. 4 illustrates transmission resources in accordance with some embodiments.

In some embodiments, the type-1 and type-2 USS for a given SSS-ID may be separately configured for PCell/PSCell. FIG. 4 illustrates transmission resources 400 in which type-1 and type-2 USSs are separately configured in accordance with some embodiments.

The PCell may include a CSS 404 and a type-1 USS 408 and the sSCell may include a type-2 USS 412 and a USS for self-scheduling 416 similar to that described above with respect to FIG. 2. However, in this embodiment, the type-1 USS 408 and the type-2 USS 412, which may be associated with the same SSS-ID, may be separately configured by, for example, separate RRC signals. The separate configurations may include different time-domain configurations, for example. Thus, in contrast to the configurations of FIG. 2/3, the type-1 and type-2 USSs of FIG. 4 are not time aligned.

Embodiments provide different techniques for switching between type-1 USS and type-2 USS monitoring for PCell/PSCell.

In one embodiment, one of the type-1 or the type-2 USS may be hard encoded or explicitly configured by RRC signaling as a default USS for PDCCH monitoring. The UE 104 May conditionally switch to monitoring the other, non-default USS when certain conditions are met. For example, the UE 104 may monitor a non-default USS only when the set of symbols in the slot(s) where the default USS are configured for uplink. In some embodiments, the uplink slot may be provided in a tdd-UL-DL-ConfigurationCommon configuration or tdd-UL-DL-ConfigurationDedicated configuration; or may be provided by DCI format 2_0.

Figure 5:
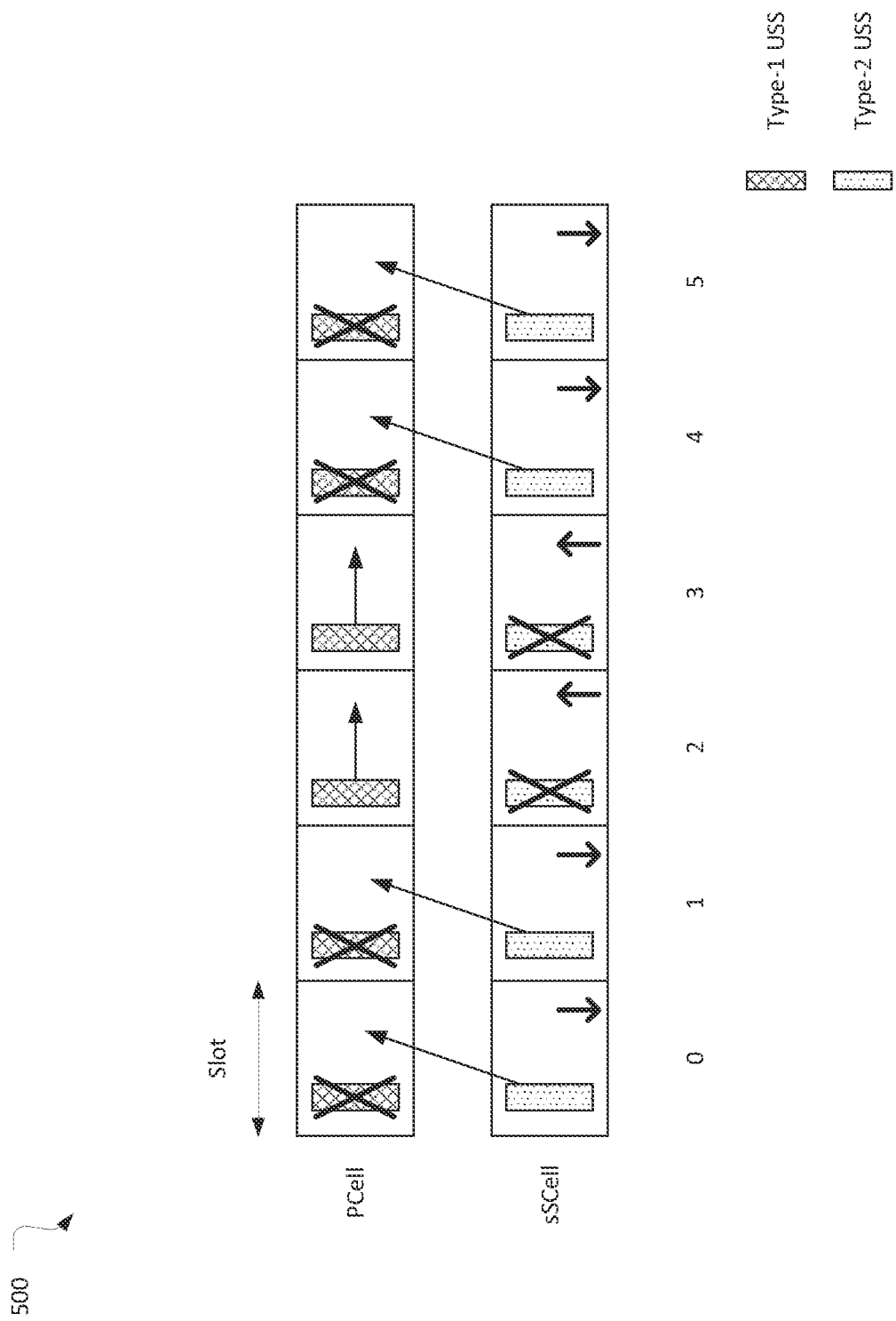
FIG. 5 illustrates transmission resources in accordance with some embodiments.

FIG. 5 illustrates transmission resources 500 to describe switching between type-1 USS and type-2 USS monitoring in accordance with some embodiments. The transmission resources 500 include six slots, slot 0-slot 5. Slots 0, 1, 4, and 5 of the sSCell may be configured for downlink, while slots 2 and 3 of the sSCell may be configured for uplink. The sSCell may be configured with type-2 USSs and the PCell may be configured with a type-1 USSs. In this embodiment, the type-2 USS may be the default USS. Thus, the UE 104 may monitor the type-2 USSs in slots 0, 1, 4, and 5. However, in slots 2 and 3, the UE 104 may switch to monitoring the non-default USS, for example, the type-1 USS.

In some embodiments, a flag may be used to switch monitoring from the first USS type to a second USS type. The flag may be transmitted by DCI as described below.

Figure 6:
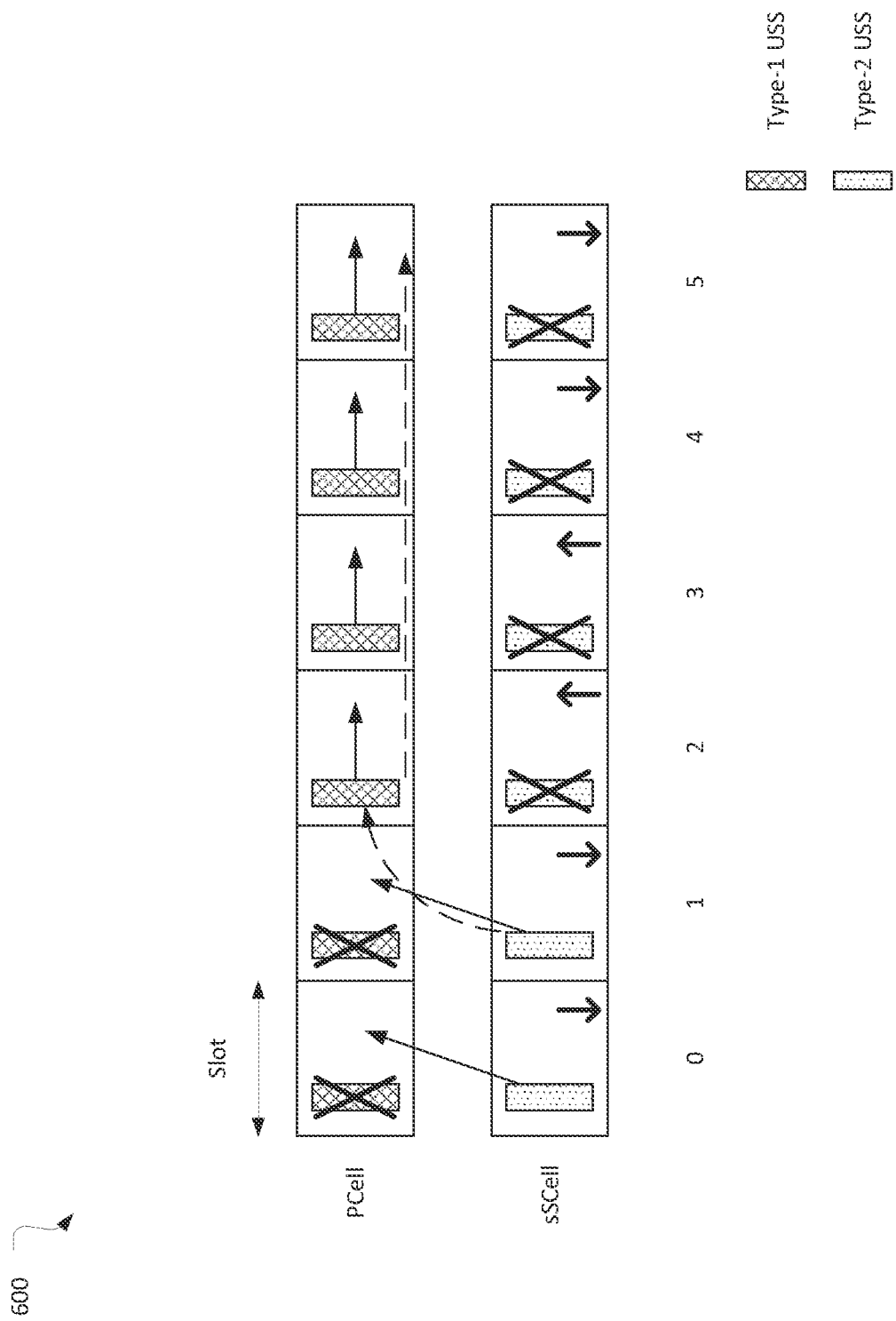
FIG. 6 illustrates transmission resources in accordance with some embodiments.

FIG. 6 illustrates transmission resources 600 to describe DCI-based switching between type-1 USS and type-2 USS monitoring in accordance with some embodiments. The transmission resources 600 include six slots, slot 0-slot 5. The sSCell may be configured with type-2 USSs and the PCell may be configured with a type-1 USSs. In this embodiment, the type-2 USS may be the default USS (or actively monitored USS). Thus, the UE 104 may begin by monitoring the type-2 USSs in slots 0, 1, 4, and 5. In slot 1, DCI in type-2 USS 604 may include an asserted switching flag. After detecting the asserted switching flag, the UE 104 may switch from monitoring the type-2 USSs to monitoring the type-1 USSs in the PCell. In some embodiments, the UE 104 may begin monitoring on the switched-to USS in a first slot that is at least P_switch symbols after the last symbol of the PDCCH with the scheduling DCI (for example, the DCI that includes the switching flag). As shown in FIG. 6, the UE 104 may receive the flag in slot 1 and start monitoring in the switched-to USS in slot 2, but the switch may be delayed other value in other embodiments.

In some embodiments, the UE 104 may continue to monitor the PDCCH on the type-1 USSs on the PCell until it receives another asserted switching flag to switch back to monitoring the type-2 USSs on the SCell.

In some embodiments, the switching flag may be a new flag field added into scheduling DCI format monitored in type-1/type-2 USS. For example, if the flag field is set to '1' in a scheduling DCI format in a first USS type (for example, type-1 USS or type-2 USS), the UE 104 may detect the switching flag as asserted and switch to monitoring the second USS type (for example, type-2 USS or type-1 USS).

In some embodiments, a timer may be introduced to facilitate the switching of USS monitoring. The timer may be used to provide an indication of when the UE 104 is to perform the initial switch. For example, the UE 104 may start the timer upon detecting the switching flag in a first USS type. The UE stop monitoring PDCCH on the first USS type and start monitoring PDCCH on the second USS type at a first slot that is at least P_switch symbols after the timer expires.

In some embodiments, the timer may be used to determine a time the UE is to monitor on the switched-to USS type. For example, the UE 104 may receive a switching flag in a first USS type. Upon switching to the second USS type, the UE 104 may start the timer and may monitor the second USS type while the timer is running. Upon expiration of the timer, the UE 104 may switch back to monitoring the first USS type.

In some embodiments, a switching flag may be indicated by a scrambling sequence [w_0, w_1, . . . , w_23] used to scramble cyclic redundancy check (CRC) bits of a scheduling DCI. Table 1, below illustrates scrambling sequences that may be used to indicate the switching flag.

TABLE 1

| Codec-state | [w_0, w_1, w_2, . . . , w_n-1] |
| --- | --- |
| 0 | [0, 0, 0, . . . , 0] |
| 1 | [1, 1, 1, . . . , 1] |

For example, the switching flag may be considered to be set to '0,' for example, not asserted, if the CRC is scrambled by [0, 0, 0, . . . , 0]; and may be considered set to '1,' for example, asserted, if the CRC is scrambled by [1, 1, 1, . . . , 1].

In some embodiments, a new DCI format with a dedicated radio network temporary identity (RNTI) value in a common search space in the PCell/PSCell may be used to indicate the selected USS type for PCell/PSCell scheduling with the following fields: USS type number 1. USS type number 2, . . . , USS type number M. Value '0' may be used to indicate type-1 USS and value '1' may be used to indicate type-2 USS in some examples. The payload size of the new DCI format may be equal to that of DCI format 1_0 including any padding bits appended to this new DCI format. The UE 104 may be configured with a field index by higher layers to determine the index to the USS type for a given UE. In some designs. DCI format 2_6, which is typically used to notify power saving information outside discontinuous reception (DRX) active time, may be used in DRX active time to indicate the selected USS type for PCell/PSCell scheduling.

Some embodiments describe PDCCH monitoring operations with respect to type-1 and type-2 USS as follows.

In a first step, the UE 104 may determine a maximum number of PDCCH BD candidates $M_{PDCCH,PCell}^{total,slot,u}$, $M_{PDCCH,sSCell}^{total,slot,u}$ and non-overlapped control channel elements (CCEs) per slot $N_{PCell}^{DL,u}$, $N_{sSCell}^{DL,u}$ for PCell/PSCell and sSCell. In some aspects, the PCell and the sSCell may be counted as a single 'virtual CC to determine the-CC BDs and non-overlapped CCE budget.

If different SCS configurations are used for the PCell/PSCell and the sSCell, the lowest SES may be used to determine the per-CC limit of $M_{PDCCH,PCell}^{total,slot,u}$, $M_{PDCCH,sSCell}^{total,slot,u}$ and $N_{PCell}^{DL,u}$, $N_{sSCell}^{DL,u}$.

In some aspects, scaling factors (for example, $\alpha\_1$, $\alpha\_2$) may be introduced to determine the per-limit BDs and CCE for the PCell based on $M = \alpha_1 * M_{PDCCH,PCell}^{total,slot,u} + \alpha_2 * M_{PDCCH,sSCell}^{total,slot,u}$, where $\alpha_1 + \alpha_2 \leq 1$.

In a second step, the UE 104 may determine PDCCH monitoring for type-1 and type-2 USS. Consider M_CSS to be the number of PDCCH BDs configured for CSS; M_type1 as the number of PDCCH BDs configured for type-1 USS; M_type2 as the number of PDCCH BDs configured for type-2 USS; and M_USS as a number of BDs available for type-1 and type-2 USS without overbooking, where M_USS=$M_{USS}$=$M_{PDCCH,PCell}^{total,slot,u}$-$M_{CSS}$.

In some embodiments, PDCCH overbooking may not be allowed for: PDCCH monitoring for the sSCell scheduling; or for the CSS on the PCell/PSCell.

In one option, PDCCH overbooking may not be allowed for type-1 and type-2 USS. With this option, the following conditions should be met for type-1 and type-2 USS configuration: $M_{Type2} \leq M_{USS}$ and $M_{Type1} \leq (M_{USS} - M_{Type1})$.

In a second option, PDCCH overbooking may be allowed for Type-1 and Type-2 USS. The UE 104 may assume that PDCCH overbooking happens if the following conditions are met with respect to one or more of the following four options.

In a first option, PDCCH overbooking may happen if: $M_{Type2} \leq M_{USS}$ (guaranteed by RRC configuration by gNB without overbooking) and $M_{Type1} + M_{Type2} > M_{USS}$. This option may generally disallow Type-2 overbooking, but allow the total of type-1/type-2 overbooking.

In a second option, PDCCH overbooking may happen if: $M_{Type1} + r*M_{Type2} > M_{USS}$ or $r*M_{Type1} + M_{Type2} > M_{USS}$, where r is a scaling factor that is greater than one and may be predefined by a 3GPP TS or reported as part of UE capability signaling.

In a third option, PDCCH overbooking may happen if $r*(M_{Type1} + M_{Type2}) > M_{USS}$, where r is a scaling factor that is greater than one and may be predefined by a 3GPP TS or reported as part of UE capability signaling.

In a fourth option. PDCCH overbooking may happen if $r*Max(M_{Type1}, M_{Type2}) > M_{USS}$. The value R may be set to one in some embodiments. The fourth option may be used in embodiments in which the UE 104 only monitors one type of USS (for example, type-1 USS or type-2 USS) for a given slot, instead of monitoring both.

If overbooking occurs, the UE 104 may advance to a third step.

In the third step, the UE 104 may employ one or more of the following three approaches to determine a priority order to allocate the PDCCH candidates for monitoring for type-1/type-2 USS up to the per CC BSs limit $M_{PDCCH,PCell}^{total,slot,u}$ and non-overlapped CCEs $N_{PCell}^{DL,u}$.

In a first approach, a priority order may be configured by RRC signaling as part of type-1/type-2 USS configuration.

In a second approach, the priority order may be predefined in a 3GPP TS. For example, type-2 may always be prioritized if the UE 104 is required to monitor both type-2 and type-1 USS.

For both the first and second approach, the search space set with a lowest index may be prioritized over others within a USS type.

In a third approach, the USS type between type-1 and type-2 USS that is actively being monitored is prioritized.

FIGS. 7-12 illustrates determination of PDCCH candidates in accordance with some embodiments. In these embodiments, the following values may be assumed: $M_{PDCCH,PCell}^{total,slot,u}$=40, $M_{CSS}$=8, $M_{USS}$=$M_{PDCCH,PCell}^{total,slot,u}$-$M_{CSS}$=32, and $M_{PDCCH,sSCell}^{total,slot,u}$=40.

Figure 7:
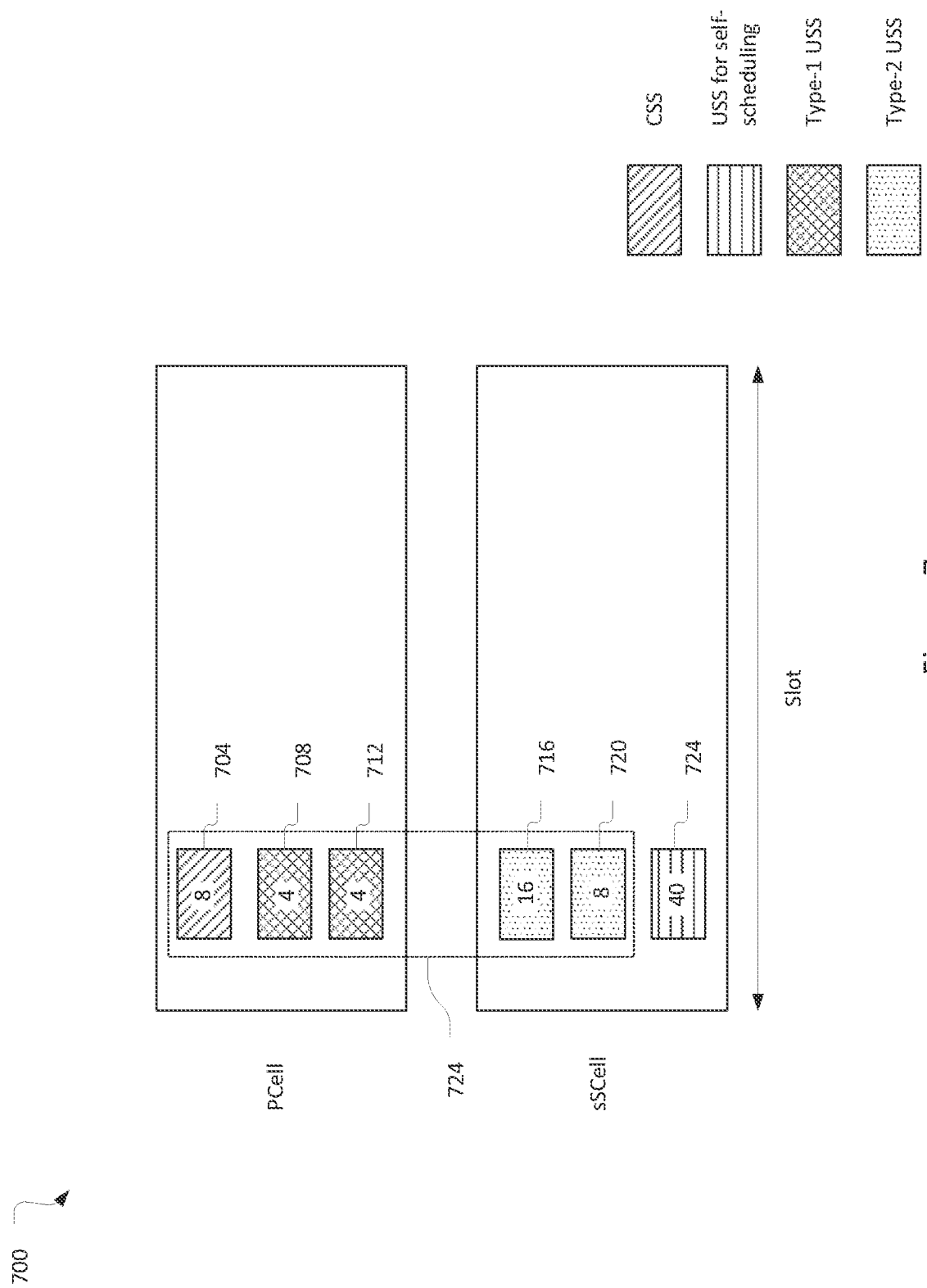
FIG. 7 illustrates transmission resources in accordance with some embodiments.

FIG. 7 illustrates transmission resources 700 in which CSS 704, type-1 USS 708, and type-1 USS 712 are in a PCell and type-2 USS 716, type-2 USS 720, and self-scheduling USS 724 are in an sSCell. PDCCH candidates in a virtual CC 728 may be counted against the BD/non-overlapped CCE budget of the PCell. In this embodiment, $M_{CSS}$=8 from CSS 704, $M_{Type1}$=8 from type-1 USS 708 and type-1 USS 712, $M_{Type2}$=24 from type-2 USS 716 and type-2 USS 720.

The configuration of the transmission resources 700 for the USS and CSS on the PCell and the sSCell may occur in the case in which PDCCH overbooking is not allowed for CSS, type-1 USS, and type-2 USS. For example, in option 1 overbooking only occurs when $M_{Type1} + M_{Type2} > M_{USS}$. With the above values, 8+24 is not greater than 32 and, therefore, no overbooking occurs. All BD candidates may be monitored by the UE 104.

Figure 8:
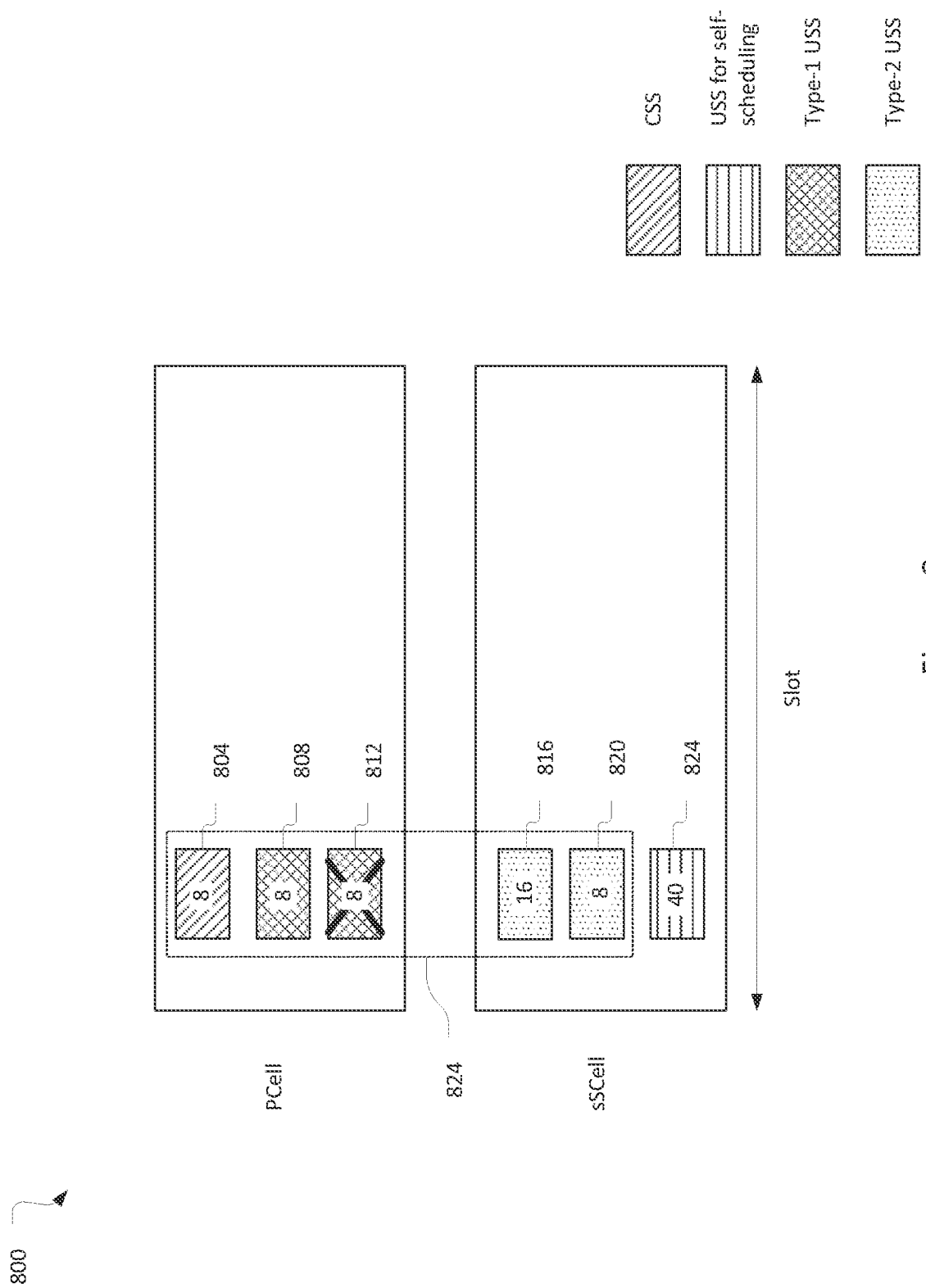
FIG. 8 illustrates transmission resources in accordance with some embodiments.

FIG. 8 illustrates transmission resources 800 in which CSS 804, type-1 USS 808, and type-1 USS 812 are in a PCell and type-2 USS 816, type-2 USS 820, and self-scheduling USS 824 are in an sSCell. PDCCH candidates in a virtual CC 828 may be counted against the BD/non-overlapped CCE budget of the PCell. With respect to previous figure, the candidates on type-1 USS 808 and type-1 USS 812 are increased to eight each to improve scheduling flexibility. In this embodiment, $M_{CSS}$=8 from CSS 804, $M_{Type1}$=16 from type-1 USS 808 and type-1 USS 812, $M_{Type2}$=24 from type-2 USS 816 and type-2 USS 820.

The configuration of the transmission resources 800 for the USS and CSS on the PCell and the sSCell may occur in the case in which PDCCH overbooking is allowed for type-/type-2 USS. For example, in option 1 overbooking occurs when $M_{Type1} + M_{Type2} > M_{USS}$. With the above values, 16+24 is greater than 32 and, therefore, overbooking does occur. If type-2 USS has priority over type-1 USS, then the UE 104 may be allowed to drop type-1 USS 812 and may monitor the remaining BD candidates.

Figure 9:
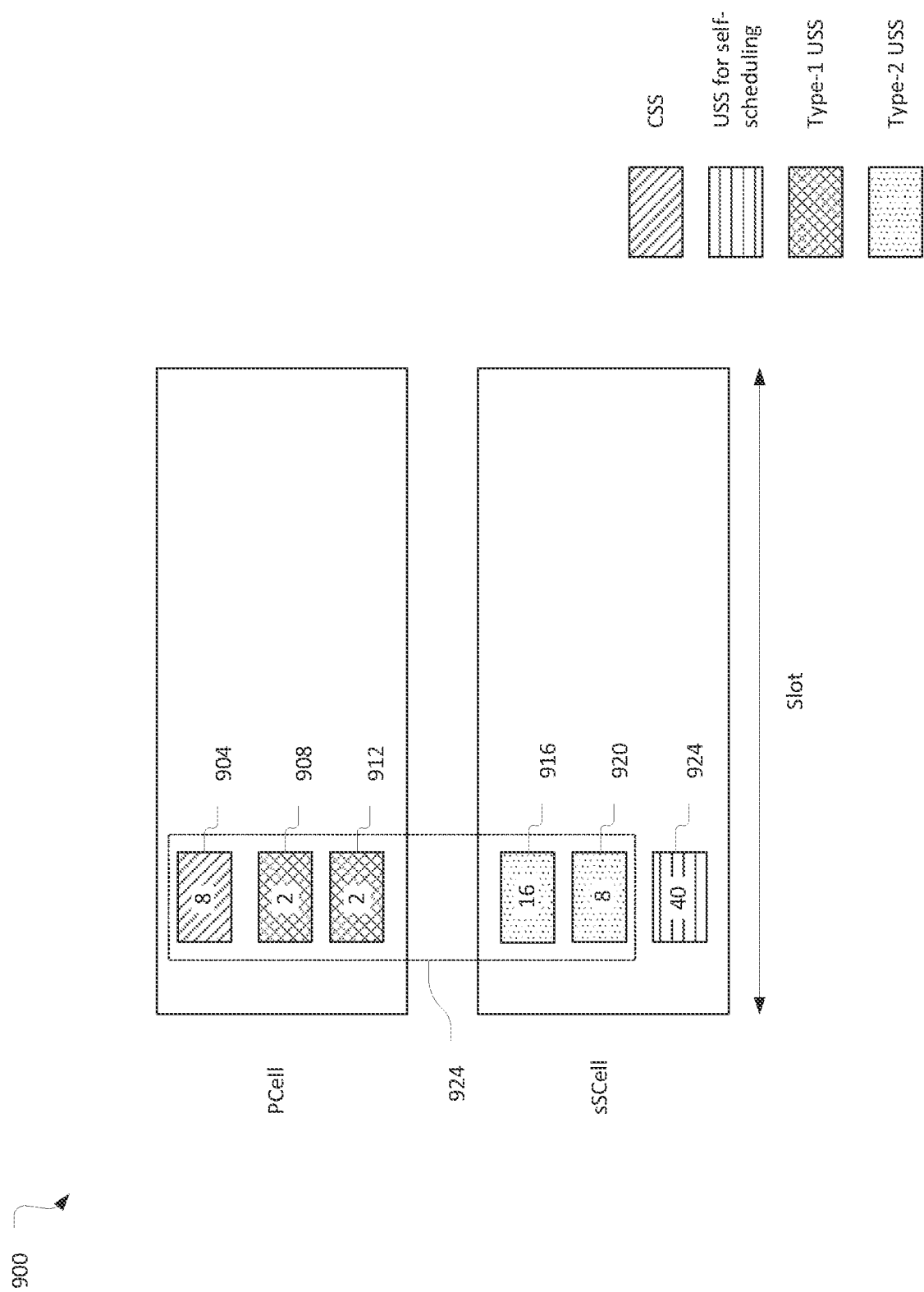
FIG. 9 illustrates transmission resources in accordance with some embodiments.

FIG. 9 illustrates transmission resources 900 in which CSS 904, type-1 USS 908, and type-1 USS 912 are in a PCell and type-2 USS 916, type-2 USS 920, and self-scheduling USS 924 are in an sSCell. PDCCH candidates in a virtual CC 928 may be counted against the BD/non-overlapped CCE budget of the PCell. With respect to previous figure, the candidates on type-1 USS 908 and type-1 USS 912 are decreased to two each. In this embodiment, $M_{CSS}$=8 from CSS 904, $M_{Type1}$=4 from type-1 USS 908 and type-1 USS 912, and $M_{Type2}$=24 from type-2 USS 916 and type-2 USS 920.

Consider that PDCCH overbooking is determined based on the second clause of option 2 above and r 2, then overbooking occurs when $r*M_{Type1} + M_{Type2} > M_{USS}$. With the above values, 2*4+24 is not greater than 32 and, therefore, overbooking does not occur. All BD candidates may be monitored by the UE 104.

Figure 10:
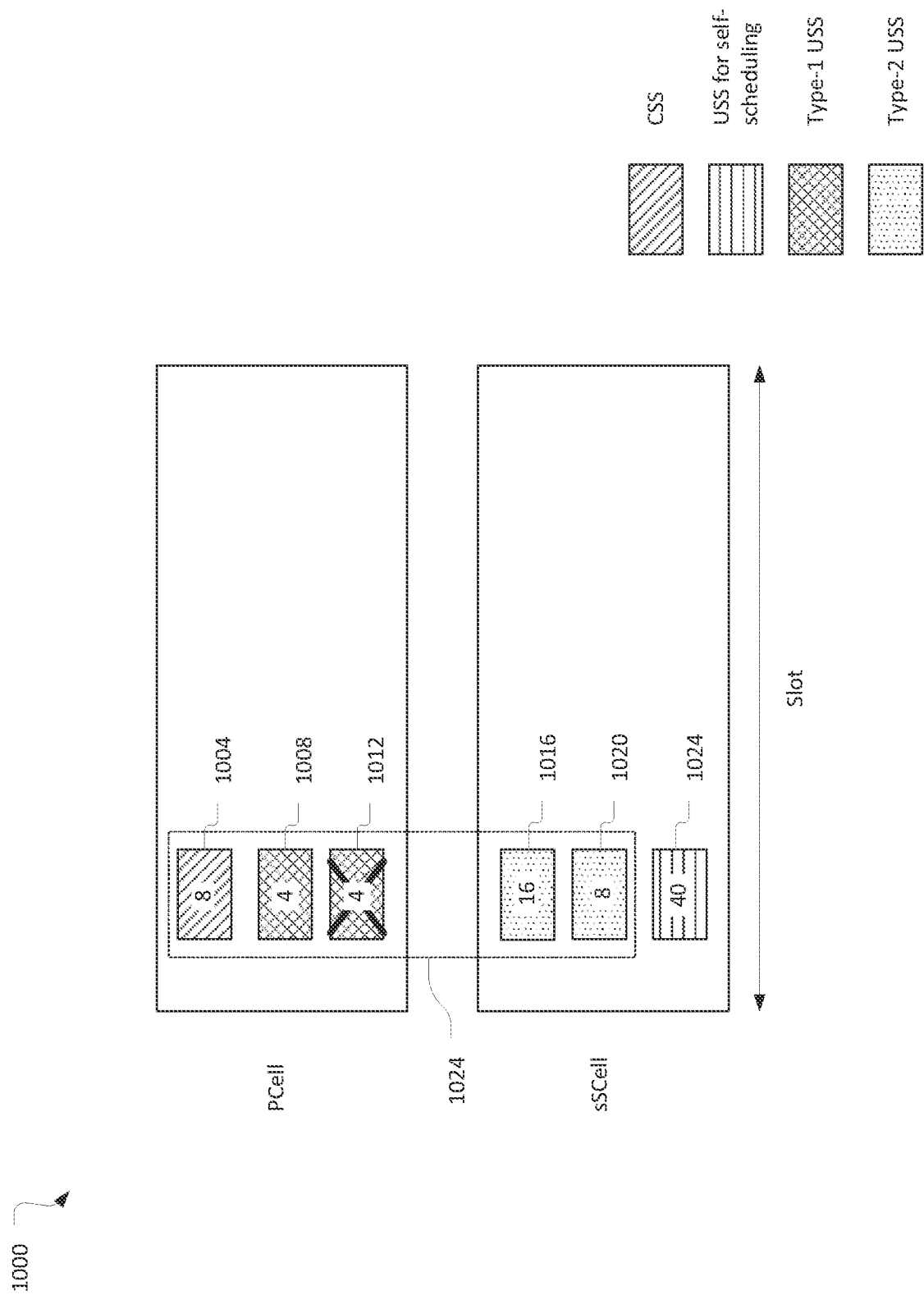
FIG. 10 illustrates transmission resources in accordance with some embodiments.

FIG. 10 illustrates transmission resources 1000 in which CSS 1004, type-1 USS 1008, and type-1 USS 1012 are in a PCell and type-2 USS 1016, type-2 USS 1020, and self-scheduling USS 1024 are in an sSCell. PDCCH candidates in a virtual CC 1028 may be counted against the BD/non-overlapped CCE budget of the PCell. With respect to previous figure, the candidates on type-1 USS 1008 and type-1 USS 1012 are increased to four each. In this embodiment, $M_{CSS}$=8 from CSS 1004, $M_{Type1}$=8 from type-1 USS 1008 and type-1 USS 1012, and $M_{Type2}$=24 from type-2 USS 1016 and type-2 USS 1020.

Consider again that PDCCH overbooking is determined based on the second clause of option 2 above and r=2, then overbooking occurs when $r*M_{Type1} + M_{Type2} > M_{USS}$. With the above values, 2*8+24 is greater than 32 and, therefore, overbooking does occur. If type-2 USS has priority over type-1 USS, then the UE 104 may be allowed to drop type-1 USS 1012 and may monitor the remaining BD candidates.

Figure 11:
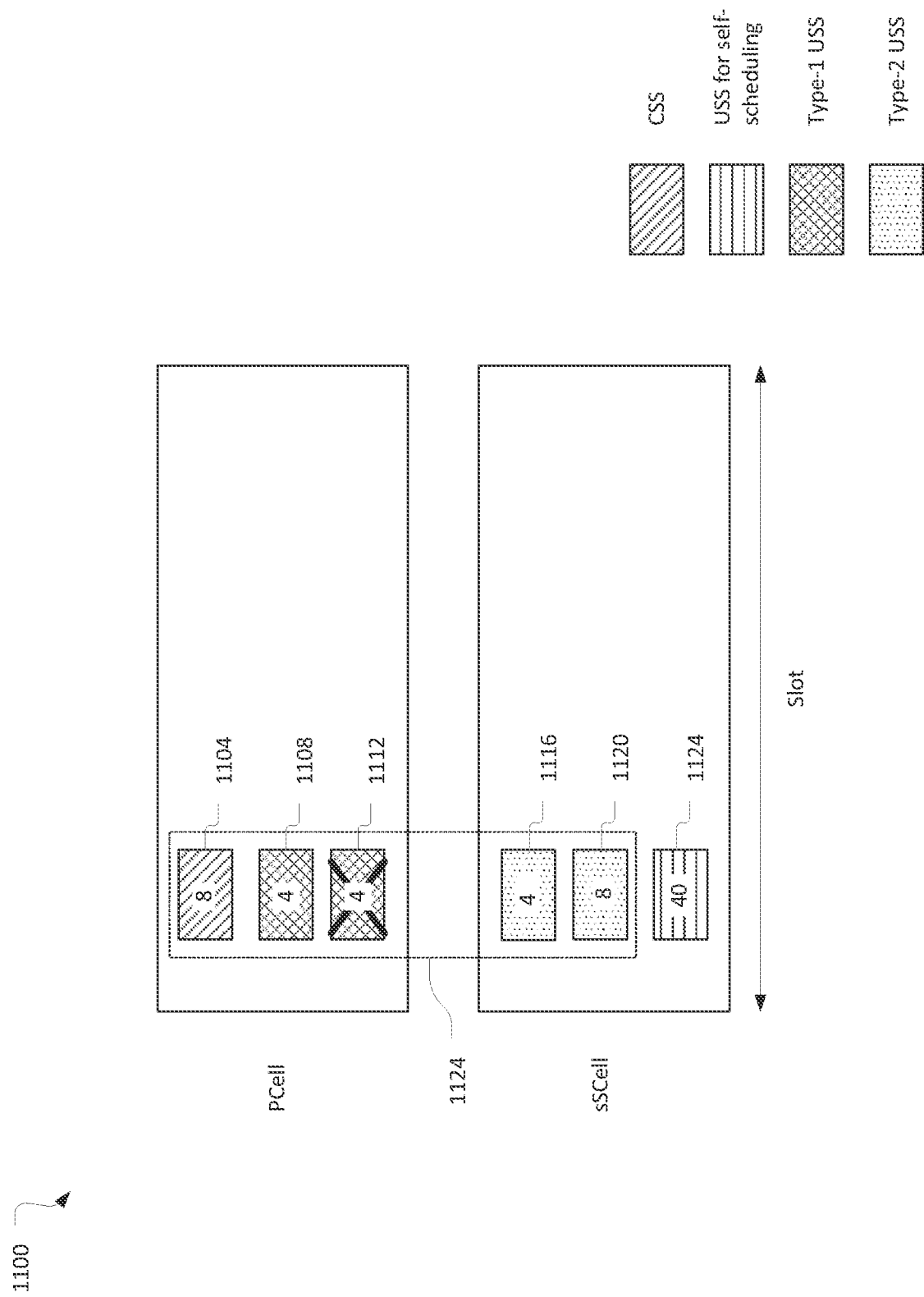
FIG. 11 illustrates transmission resources in accordance with some embodiments.

FIG. 11 illustrates transmission resources 1100 in which CSS 1104, type-1 USS 1108, and type-1 USS 1112 are in a PCell and type-2 USS 1116, type-2 USS 1120, and self-scheduling USS 1124 are in an sSCell. PDCCH candidates in a virtual CC 1128 may be counted against the BD/non-overlapped CCE budget of the PCell. With respect to previous figure, the candidates on type-2 USS 1116 and type-2 USS 1120 are decreased to four and eight respectively. In this embodiment, $M_{CSS}$=8 from CSS 1104, $M_{Type1}$=8 from type-1 USS 1108 and type-1 USS 1112, and $M_{Type2}$=12 from type-2 USS 1116 and type-2 USS 1120.

Consider that PDCCH overbooking is determined based on the third option above and r=2, then overbooking occurs when $r*(M_{Type1}+M_{Type2})>M_{USS}$. With the above values, 2*(8+12) is greater than 32 and, therefore, overbooking does occur. If type-2 USS has priority over type-1 USS, then the UE 104 may be allowed to drop type-1 USS 1112 and may monitor the remaining BD candidates. After dropping type-1 USS 1112, overbooking will no longer occur, for example, 2*(4+12) is not greater than 32.

Figure 12:
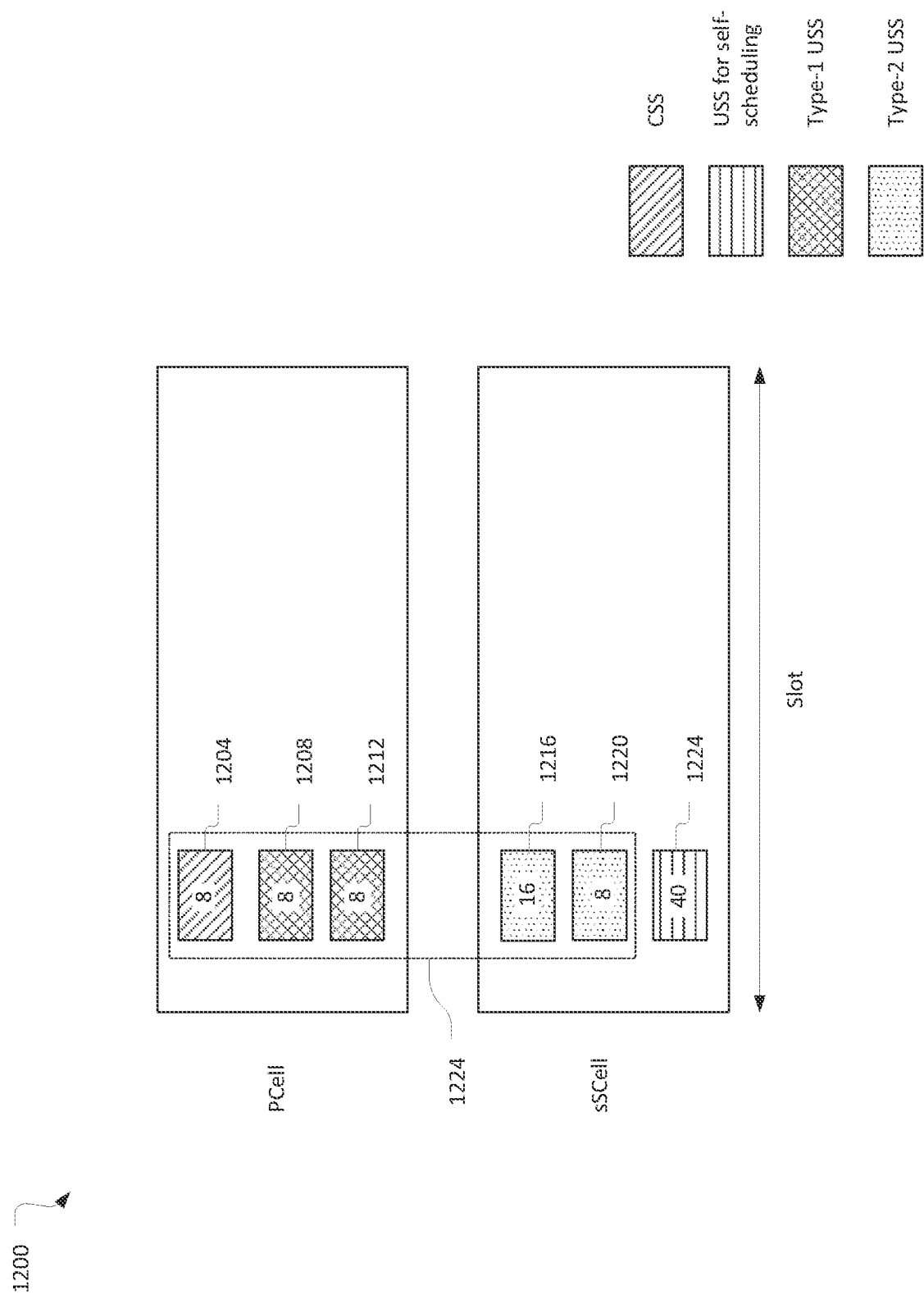
FIG. 12 illustrates transmission resources in accordance with some embodiments.

FIG. 12 illustrates transmission resources 1200 in which CSS 1204, type-1 USS 1208, and type-1 USS 1212 are in a PCell and type-2 USS 1216, type-2 USS 1220, and self-scheduling USS 1224 are in an sSCell. PDCCH candidates in a virtual CC 1228 may be counted against the BD/non-overlapped CCE budget of the PCell. With respect to previous figure, the candidates on type-1 USS 1208 and type-1 USS 1212 are both increased to eight, type-2 USS 1216 is increased to 16, and type-2 USS 1220 is increased to eight. In this embodiment, $M_{CSS}$=8 from CSS 1204, $M_{Type1}$=16 from type-1 USS 1208 and type-1 USS 1212, and $M_{Type2}$=24 from type-2 USS 1216 and type-2 USS 1220.

Consider that PDCCH overbooking is determined based on the fourth option above and r=1, then overbooking occurs when $r*Max(M_{Type1},M_{Type2})>M_{USS}$. With the above values, 1*max(16, 24) is not greater than 32 and, therefore, overbooking does not occur. All BD candidates may be monitored by the UE 104. As can be seen, this option may allow larger BDs/CCEs for the base station as compared to the other options, but may also be a more stringent burden at the UE.

Embodiments also describe reference signal transmission in wireless communication.

Reference signal enhancements may be needed as NR operation expands to higher frequencies, for example, up to 71 GHz, and includes higher frequency SCS, for example, 480 kHz SCS and 960 kHz SCS.

Figure 13:
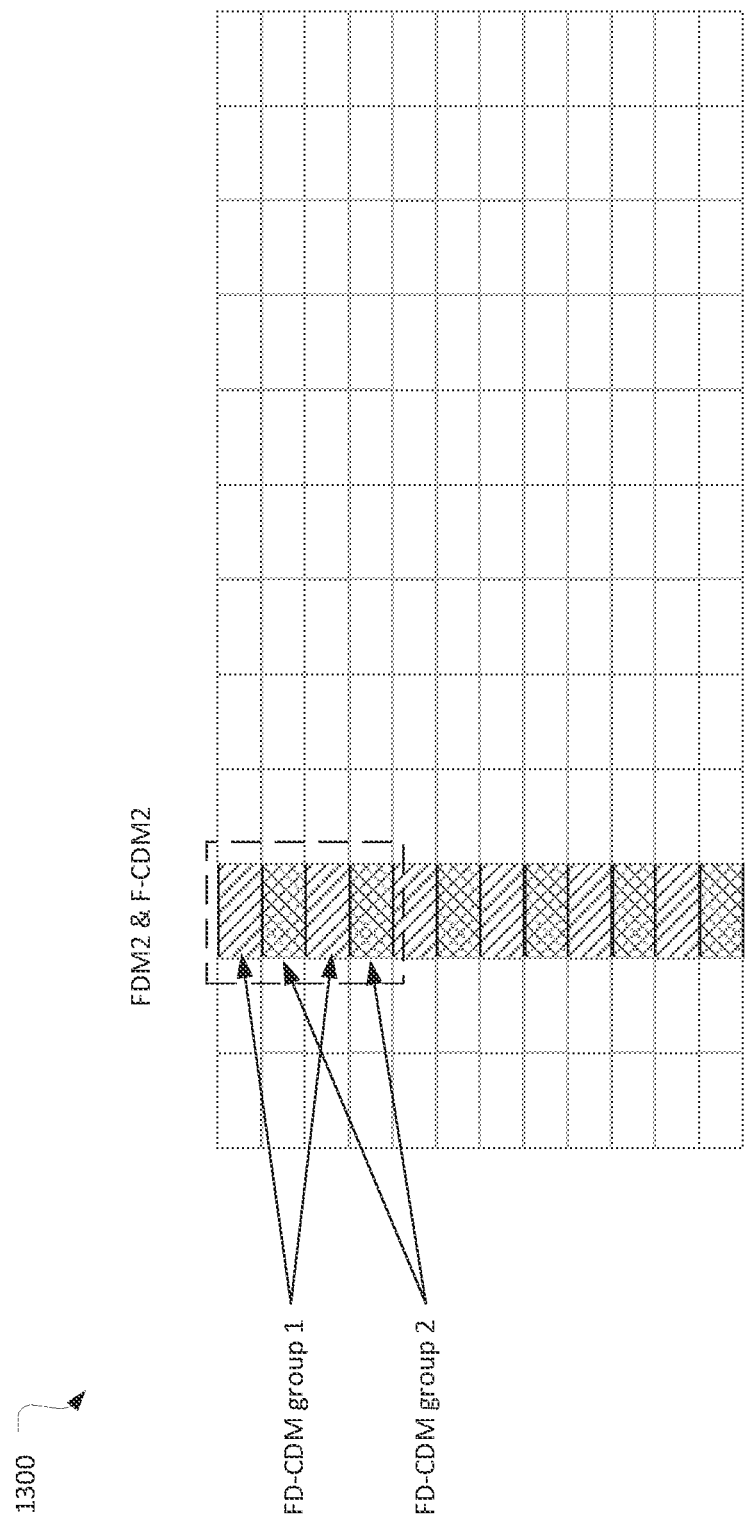
FIG. 13 illustrates transmission resources in accordance with some embodiments.

FIG. 13 illustrates transmission resources 1300 in which comb-based resource element (RE) mapping is used for demodulation reference signal (DMRS) associated with different antenna ports for configuration 1. In addition to further reduce DMRS overhead, antenna ports may be allowed to be code division multiplexed (CDM) in frequency domain (for example, frequency domain (FD)-CDM) and time domain (for example, TD-CDM) as shown in FIG. 13.

For example, FD-CDM group 1 may be able to map two DMRS sequences on two REs. A first two REs of the FD-CDM group 1 may include DMRS sequences associated with two antenna ports, AP0 and AP1. A first orthogonal cover code (OCC) (for example, <1,1>) may be applied to the DMRS sequence for AP0 and a second OCC (for example, <1,−1>) may be applied to the DMRS sequence for AP1. A first two REs of the FD-CDM group 2 may include DMRS sequences associated with two additional antenna ports, AP2 and AP3. The first OCC may be applied to the DMRS sequence for AP2 and the second OCC may be applied to the DMRS sequence for AP3. The first/second OCCs may be reused given the spacing between the first and second REs in the frequency domain.

Above 52.6 GHz frequency range, channels with significant time dispersion (for example, large delay spread) may rustle in the frequency selectivity and cause a loss in orthogonality between FD OCCs used for the different layers, for example, in rank-2 transmission. The poor interpolation and loss in orthogonality among two ports that are FD-CDM'd may degrade performance of practical channel estimation.

Embodiments describe enhancements to DMRS patterns to improve the channel estimation and avoid unnecessary UE complexity. Some embodiments describe keeping a same number of maximum layers in order to improve the resource spectrum efficiency. This may be especially beneficial for system designs above 52.6 GHz.

A variety of approaches may be considered for DMRS resource mapping associated with PDSCH/PUSCH transmissions or CSI-RS transmission to mitigate the performance loss caused by a loss in orthogonality between FD OCCs used for different ports.

In a first option, the FD-CDM may be disabled for a predefined set of subcarrier spacing configurations. The predefined set of subcarrier spacing configurations may be defined in a 3GPP TS. For example in some embodiments the set of subcarrier spacing configurations for which FD-CDM is disabled may include configurations with 480 kHz SCS or 960 kHz SCS.

In a second option, the FD-CDM for a given SCS, for example, 480 kHz SCS, may be controlled and semi-statically disabled by using a new IE in system information (for example, system information block 1 (SIB-1)) or dedicated RRC signaling for a given UE. This may allow the base station to enable/disable FD-CDM for DMRS based on UE-specific channel characteristics such as, for example, a delay spreading profile.

In a third option, a new MAC CE may be introduced to disable/enable the FD-CDM for a CDM group corresponding to a given SCS on a per-UE basis. The MAC CE may be identified by a MAC subheader with a dedicated logical channel ID (LCID).

Figure 14:
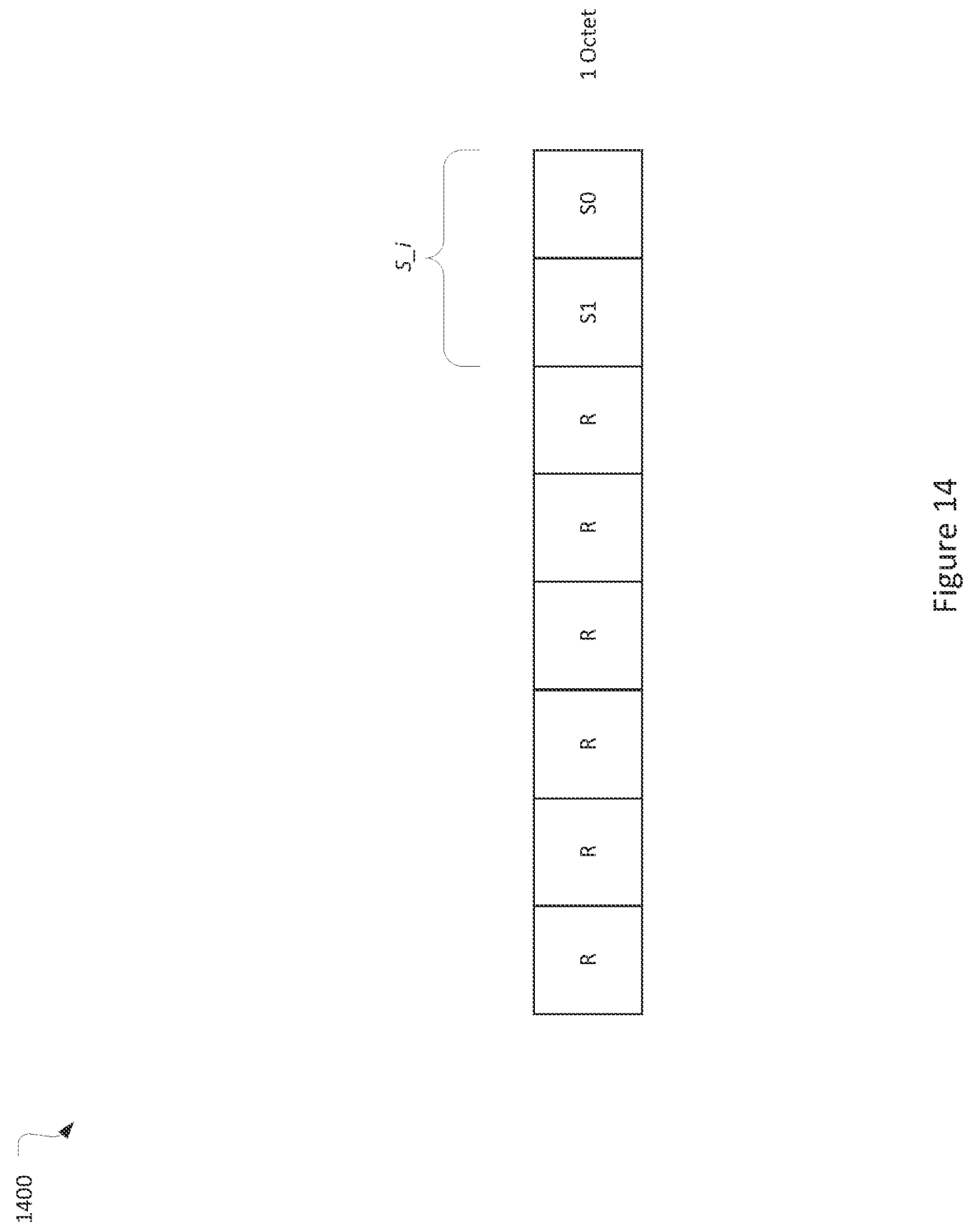
FIG. 14 illustrates a control element in accordance with some embodiments.

FIG. 14 illustrates a MAC CE 1400 that may be used to disable/enable FD-CDM in accordance with some embodiments. The MAC CE 1400 may include an S_i field that indicates whether FD-CDM is enabled or disabled for DMRS/CSI-RS with numerology index i. The S_i field may be set to '1' to indicate that FD-CDM for DMRS/CSI-RS with corresponding SCS i is enabled. The S_i field may be set to '0' to indicate that FD-CDM for DMRS/CSI-RS with corresponding SCS i is disabled. In one embodiment, a 480 kilohertz SCS may be configured as SCS 0 and a 960 kHz SCS may be configured as SCS 1. The reserved bits (R) of the MAC CE 1500 may be set to '0'.

In a fourth option, FD-CDM may be enabled or disabled for DMRS RE mapping using a scheduling DCI format. This may allow a base station to enable/disable the FD-CDM for DMRS based on the actual modulation and coding scheme (MCS) of the scheduled PDSCH. As one example, for higher MCS level, the FD-CDM may be disabled to avoid performance loss. For lower MCS level, the FD-CDM may be enabled to improve system spectrum efficiency.

Figure 15:
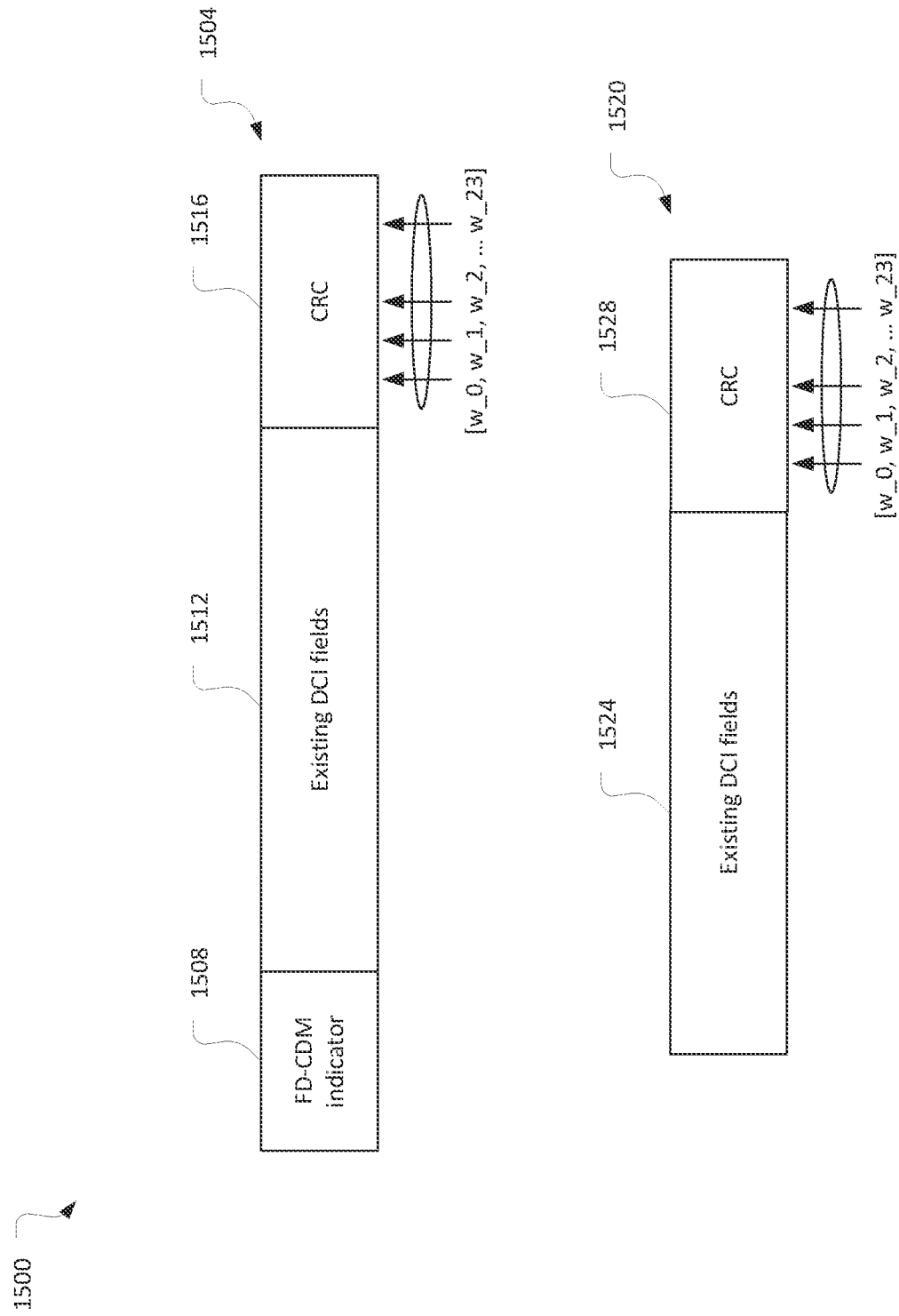
FIG. 15 illustrates downlink control information in accordance with some embodiments.

FIG. 15 illustrates two example DCIs that may be used to indicate whether FD-CDM is enabled or disabled in accordance with some embodiments.

DCI 1504 may include a new field, FD-CDM indicator 1508 that is added to the existing DCI fields 1512 and the CRC 1516. The FD-CDM indicator 1508 may be used to dynamically enable/disable FD-CDM for DMRS mapping. The FD-CDM indicator 1508 may include one bit. In some embodiments, the value may be set to '1' to indicate disabling of FD-CDM, which may also imply that other UEs are not co-scheduled in the same CDM group.

DCI 1520 may include the existing DCI field 1524 and the CRC 1528, but may not include an FD-CDM indicator field. Instead, the DCI 1520 may provide the FD-CDM indicator by selection of a scrambling sequence [w_0, w_1, w_2, ... w_23] that is used to scramble the bits in CRC 1528. In some embodiments, the selection of the scrambling sequence may convey 1-bit enabling/disabling information as shown in Table 2.

TABLE 2

| 1-BIT FD-CDM INDICATOR | [w_0, w_1, w_2, ... , w_23] |
| --- | --- |
| 0 | [0, 0, 0, ... , 0] |
| 1 | [1, 1, 1, ... , 1] |

To accommodate dynamic enabling/disabling of FD-CDM, some embodiments provide enhancements to DMRS AP signaling. For example, new AP tables may be defined for the 'antenna ports' field in DCI format 1_1 and 1_2 so as to reduce the signaling overhead when FD-CDM is disabled for DMRS ports of the PDSCH/PUSCH. In particular, Tables 3 and 4 are developed to more efficiently signal DMRS AP when FD-CDM is disabled.

Table 3 illustrates a two-bit table (for example, two bits to provide one of four values) for antenna port(s) (1000+ DMRS port) with a DMRS type 1 and a maximum length of one (for example, a DMRS sequence is conveyed by one symbol).

TABLE 3

One Codeword: Codeword 0 enabled, Codeword 1 disabled

| Value | Number of DRMS CBM group(s) without data | DMRS Port(s) |
| --- | --- | --- |
| 0 | 1 | 0 |
| 1 | 2 | 0 |
| 2 | 2 | 2 |
| 3 | 2 | 0, 2 |

Table 4 illustrates a four-bit table (for example, four bits to provide one of 12 values, with four values reserved) for antenna port(s) (1000+DMRS port) with a DMRS type 1 and a maximum length of two (for example, a DRMS sequence is conveyed by two symbols).

TABLE 4

One Codeword: Codeword 0 enabled, Codeword 1 disabled

| Value | Number of DRMS CDM group(s) without data | DMRS Port(s) | Number of front-load symbols |
| --- | --- | --- | --- |
| 0 | 1 | 0 | 1 |
| 1 | 2 | 0 | 1 |
| 2 | 2 | 2 | 1 |
| 3 | 2 | 0, 2 | 1 |
| 4 | 1 | 0 | 2 |
| 5 | 2 | 0 | 2 |
| 6 | 2 | 2 | 2 |
| 7 | 2 | 0, 2 | 2 |
| 8 | 1 | 0, 4 | 2 |
| 9 | 2 | 0, 4 | 2 |
| 10 | 2 | 0, 2, 4 | 2 |
| 11 | 2 | 0, 2, 4, 6 | 2 |
| 12-15 | Reserved | Reserved | Reserved |

In developing Tables 3 and 4, the lowest DMRS port within a DMRS group is defined as a leading port. Within a CDM group, ports other than the leading port can be used on condition that the leading port is used. For example, port 0 may be the leading port for CDM group 0. Correspondingly, it is not supported to indicate 'port 1' in length-1 DMRS pattern for rank-1 as shown in Table 3.

If the UE 104 receives a DCI having a value of an AP field set to 2 (for example, bit value of [10]) for a length-1 DMRS pattern for rank 1, it may reference Table 3 to determine that the base station is to schedule data using DMRS port 2.

Disabling FD-CDM within a same CDM group for larger SCS may degrade peak data rate performance since up to two layers supported for single symbol DMRS and up to four layers are supported for double-symbol DMRS. To address this, the following options may be considered.

In a first option, a new DMRS pattern for configuration type 1 DMRS may be used such that the DMRS sequence associated with a single DMRS port is mapped to consecutive REs in frequency domain (k,l)_p,u according to the following equation:

$k = 4n + k' + \Delta$, where $k'=0,1; n=0,1 \ldots$; and $\Delta=0,1$.

Figure 16:
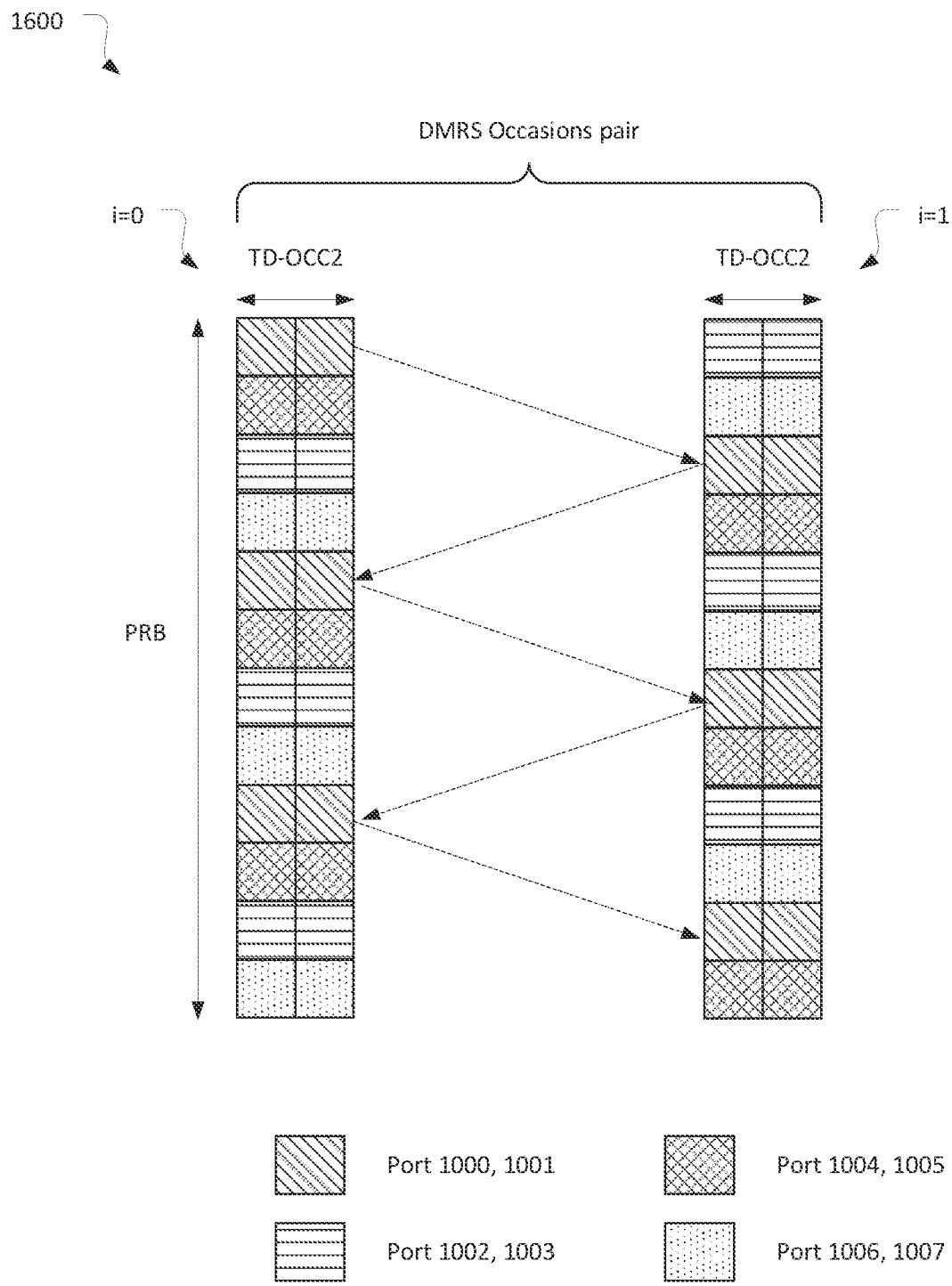
FIG. 16 illustrates transmission resources in accordance with some embodiments.

In a second option, DMRS sequence is may be mapped to resource elements (k,l)_p,u across paired DMRS occasions, which may be indexed by i=0,1 as shown by transmission resources 1600 of FIG. 16 in accordance with some embodiments and according to the following equation:

$$k = (4n + k' + \Delta) \bmod 12, \text{ where}$$

$$k' = \begin{cases} 0 & p \in \{1000, 1001\} \\ 1 & p \in \{1002, 1003\} \\ 2 & p \in \{1004, 1005\} \\ 3 & p \in \{1006, 1007\} \end{cases},$$

$$n = 0, 1, \ldots, \text{ and}$$

$$\Delta = \begin{cases} 0 & i = 0 \\ 2 & i = 1 \end{cases}.$$

Table 5 illustrates the OCCs ($\omega_r(l')$) that may be applied for the different antenna ports (p) and CDM groups.

TABLE 5

| | | $\omega_r(l')$ | |
| --- | --- | --- | --- |
| p | CDM group | l' = 0 | l' = 1 |
| 1000 | 0 | +1 | +1 |
| 1001 | 0 | +1 | −1 |
| 1002 | 1 | +1 | +1 |
| 1003 | 1 | +1 | −1 |
| 1004 | 2 | +1 | +1 |
| 1005 | 2 | +1 | −1 |
| 1006 | 3 | +1 | +1 |
| 1007 | 3 | +1 | −1 |

Mapping the DMRS sequences to the REs as described with respect to the second option may support a data transmission up to eight layers.

Denoted the number of layers of a PDSCH/PUSCH with R, the positions of the double-symbol DMRS occasions in a DMRS occasion pair may be determined according to one of the following three options.

In a first option, the PDSCH/PUSCH with R>4 may be allowed only when the data duration $l_d$>9 for PDSCH mapping type A and $l_d$>7 for PDSCH mapping type A as shown in Table 6 below.

TABLE 6

| $l_d$ in symbol | PDSCH Mapping Type A | PDSCH Mapping Type B |
|---|---|---|
| 8 | — | $l_0$, 5 |
| 9 | — | $l_0$, 5 |
| 10 | $l_0$, 8 | $l_0$, 7 |
| 11 | $l_0$, 8 | $l_0$, 7 |
| 12 | $l_0$, 8 | $l_0$, 8 |
| 13 | $l_0$, 10 | $l_0$, 8 |
| 14 | $l_0$, 10 | — |

When the data duration $l_d$>9 for PDSCH mapping type A or $l_d$>7 for PDSCH mapping type A occurs, the UE 104 may assume pairs of DMRS occasions are used for PDSCH/PUSCH. Representing the first DMRS symbol of DMRS occasion i by $l_0^i$, i=0,1, the value of $l_0^i$, i=0,1 are provided in Table 6 for PDSCH mapping type A/B.

Figure 17:
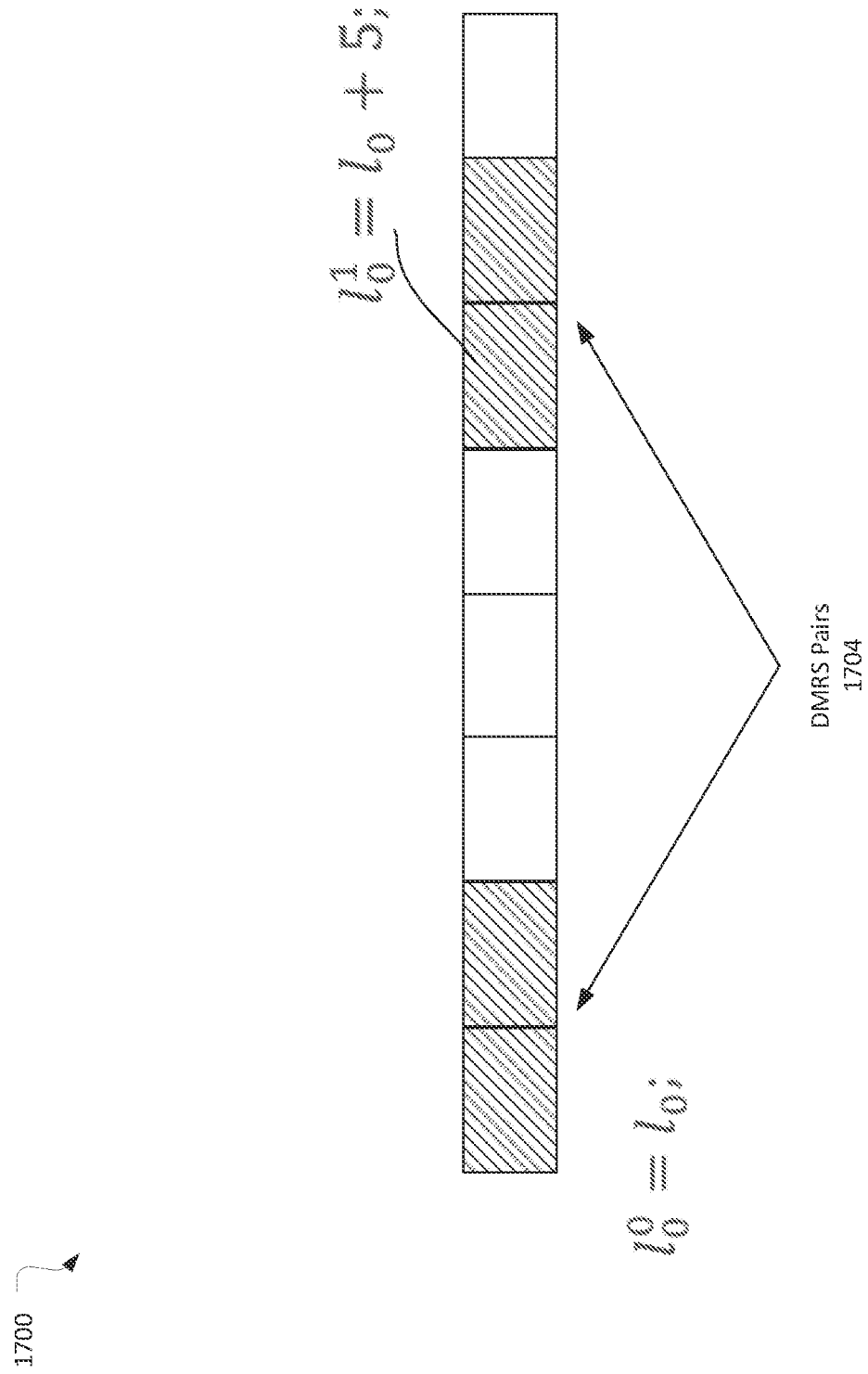
FIG. 17 illustrates transmission resources in accordance with some embodiments.

FIG. 17 illustrates transmission resources 1700 with a DMRS pairs 1704 in accordance with some embodiments. In particular, the transmission resources 1700 illustrate DMRS positions <$l_0^0$, $l_0^1$> for PDSCH mapping Type B with $l_d$=8. With this design, the paired double-symbol DMRS occasions are transmitted with a first symbol $l_0^0$=$l_0$, $l_0^1$=$l_0$+5. The pattern in FIG. 16 may be used for the DMRS pairs.

A second option for determining the positions of the double-symbol DMRS occasions in a DMRS occasion pair may be as follows. When R 4 is detected in a DCI format, the UE 104 may assume that the DMRS occasions into consecutive PDSCH or PUSCH occasion scheduled by a single DCI format are aggregated together to form the DMRS occasion pair.

Figure 18:
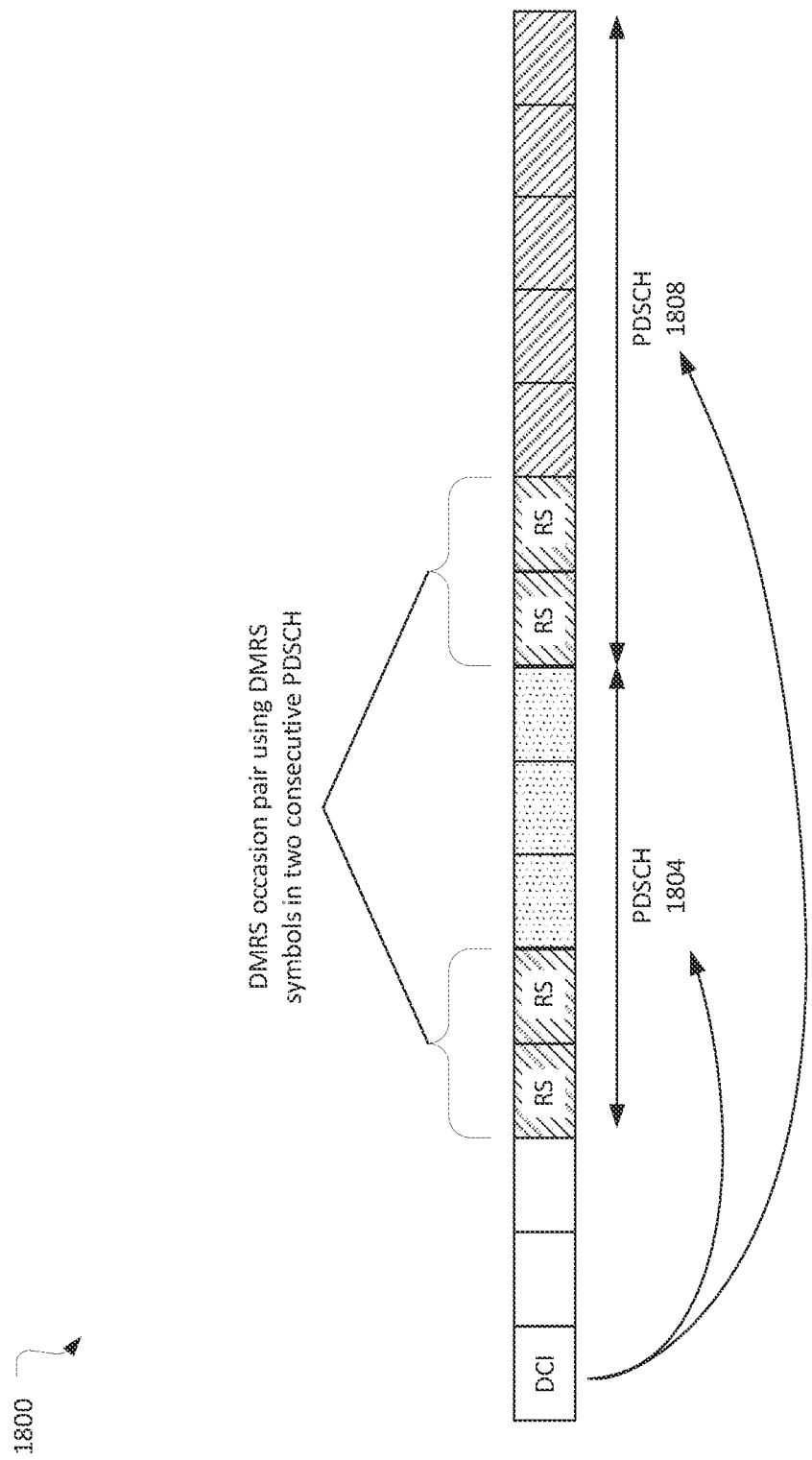
FIG. 18 illustrates transmission resources in accordance with some embodiments.

FIG. 18 illustrates transmission resources 1800 with a DMRS pairing aggregated across consecutive PDSCH occasions to support high-RANK PDSCH transmission in accordance with some embodiments. In this embodiment, DCI may schedule two consecutive PDSCHs, PDSCH 1804 and PDSCH 1808.

The transmission resources 1800 provides on example to support R>4 for multi-PDSCH scheduling by leveraging the double-symbol front-loaded DMRS in two consecutive PDSCH transmissions 1804 and 1808. It may be noted that the frequency shifted DMRS pattern depicted in FIG. 16 may be used in the DMRS pairs in PDSCH 1804 and 1808 in some embodiments.

When additional DMRS occasions exist in a single PDSCH transmission within multiple PDSCHs, the DMRS occasion pair may be formed by DMRS occasions within a single PDSCH transmission as described above with respect to FIG. 18, for example.

A third option for determining the positions of the double-symbol DMRS occasions in a DMRS occasion pair may increase the number of front-loaded DMRSs. For example, the number of front-loaded DMRSs may be increased to B symbols, where B>2, to enable R>4 transmission. In some embodiments, B=4 for 480 kHz SCS and 960 kilohertz SCS instead of 2 as shown above with respect to FIG. 18.

Figure 19:
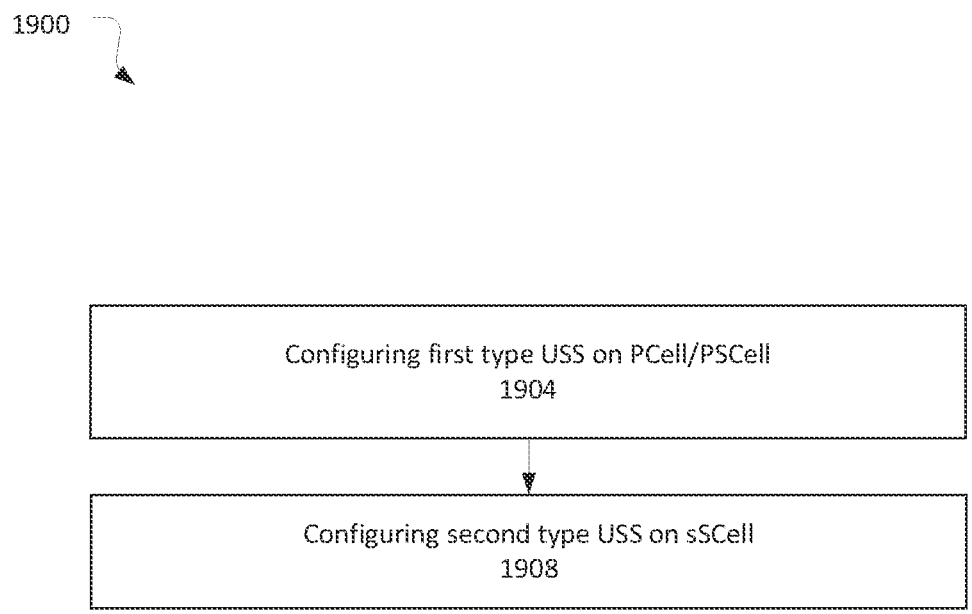
FIG. 19 illustrates an operational flow/algorithmic structure in accordance with some embodiments.

FIG. 19 illustrates an operation flow/algorithmic structure 1900 in accordance with some embodiments. The operation flow/algorithmic structure 1900 may be performed or implemented by a base station such as, for example, base station 108, 112, or 2300; or components thereof, for example, baseband processor 2304A.

The operation flow/algorithmic structure 1900 may include, at 1904, configuring a first type USS on a PCell/PSCell. The first type USS may be a type-1 USS that may be used for transmitting PDCCH that schedules a PUSCH or PDSCH on the PCell/PSCell. The first type USS may be a type-1 USS that may be used for transmitting PDCCH that schedules a PUSCH or PDSCH on the PCell/PSCell.

The operation flow/algorithmic structure 1900 may further include, at 1908, configuring a second type USS on an sSCell. The second type USS may be a type-2 USS that may be used for transmitting PDCCH that schedules a PUSCH or PDSCH on the PCell/PSCell. The base station may configure the first and second type USSs that share an SSS-ID with identical configuration parameters. The identical parameters may include CORESET index, duration, PDCCH BD candidates, DCI formats for monitoring, PDCCH monitoring periodicity and offset, or PDCCH monitoring span within a slot. In some embodiment the identical parameters configured for the first and second type USSs may fully align the USSs in the time domain.

In some embodiments, the base station may configure the first and second type USSs by explicitly configuring a first one of the first/second type USS and configuring a second one of the first/second type USS by association. For example, in the configuration of the first one of the first/second type USS, the base station may provide an indication that the first one is associated with a second one of the first/second type USS. This may be done by including a USS presence flag for the appropriate type in the configuration signaling.

Figure 20:
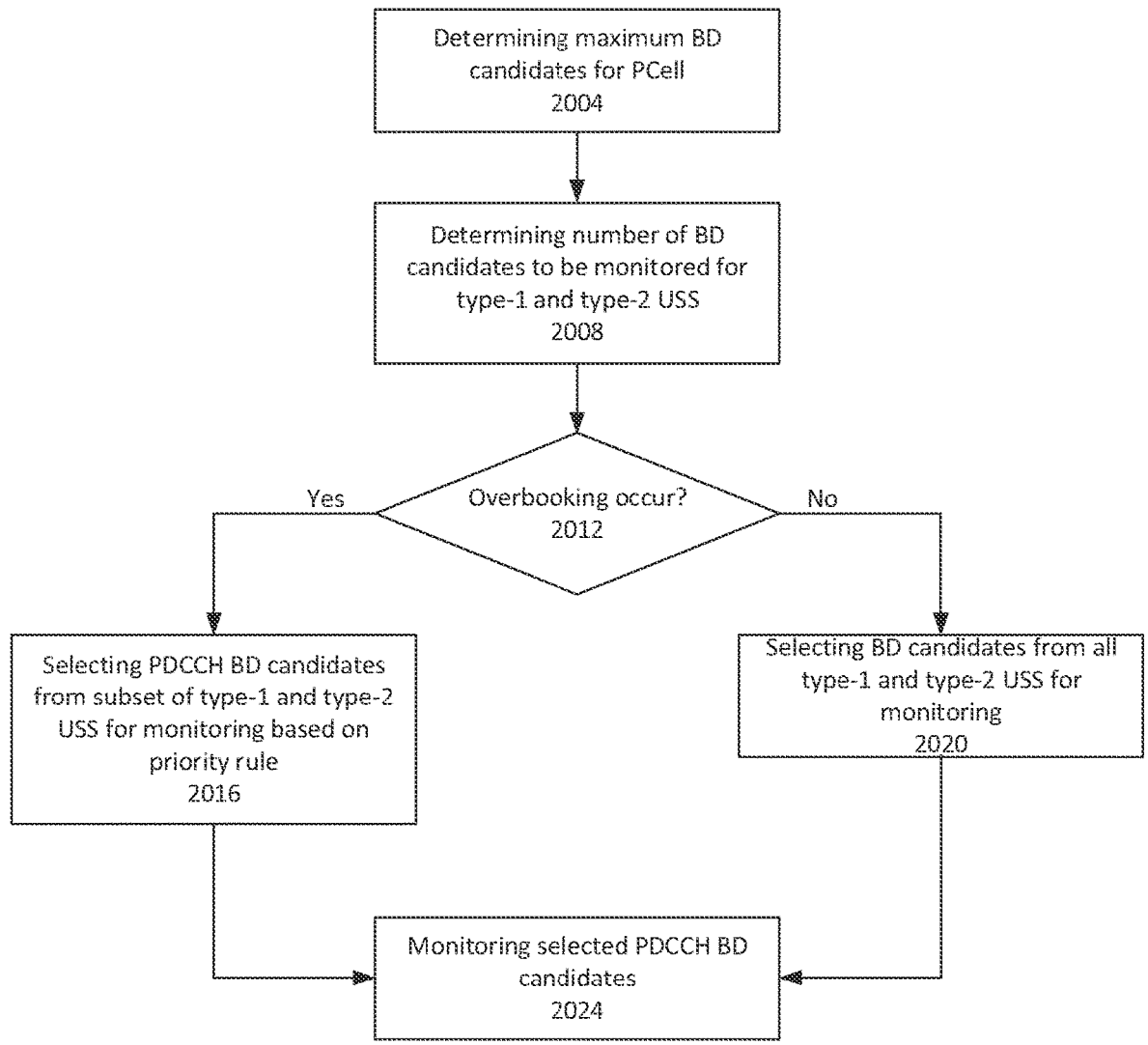
FIG. 20 illustrates another operational flow/algorithmic structure in accordance with some embodiments.

FIG. 20 illustrates an operation flow/algorithmic structure 2000 in accordance with some embodiments. The operation flow/algorithmic structure 2000 may be performed or implemented by a UE such as, for example, UE 104 or UE 2200; or components thereof, for example, baseband processor 2204A.

The operation flow/algorithmic structure 2000 may include, at 2004, determining a maximum number of BD candidates for a PCell or PScell. This value may be given as $M_{PDCCH,PCell}^{total,slot,u}$ as discussed above.

The operation flow/algorithmic structure 2000 may further include, at 2008, determining a number of BD candidates to be monitored for type-1 USS and type-2 USS. The determined number of BD candidates to be monitored for type-1 USS and type-2 USS may be considered as a number of BD candidates to be monitored for a virtual component carrier that includes portions of the primary component carrier on which the type-1 USS is located and portions of the secondary component carrier on which the type-2 USS is located.

The operation flow/algorithmic structure 2000 may further include, at 2012, determining whether overbooking occurs. The UE may determine whether overbooking occurs based on the beam maximum number of BD candidates for the PCell/PSCell and the number of PDCCH BD candidates that are to be monitored for the type-1 and type-2 USSs. In some embodiments, the UE may first determine a maximum number of BD candidates that may be monitored for USS on the virtual component carrier. This may be the maximum number of BD candidates for the PCell/PSCell minus a number of BD candidates that are to be monitored for CSS. The UE may then compare the number of BD candidates that are to be monitored for type-1 and type-2 USS against the maximum number of BD candidates that may be monitored for the USS. In some embodiments such as those described above with respect to the second, third, and fourth option for determining whether PDCCH overbooking happens, a scaling factor may be applied to either the number of BD candidates to be monitored for type-1 USS; the number of BD candidates to be monitored for type-2 USS, the number of BD candidates to be monitored for both the type-1 and type-2 USS, or a maximum value of the number of BD candidates for the type-1 or type-2 USS.

In some embodiments, a maximum number of BD candidates that may be monitored for USSs on the virtual component carrier may be determined based on a value derived from a sum of the maximum number of BD candidates for the PCell/PSCell multiplied by a first scaling factor and the maximum number of BD candidates for the sSCell multiplied by a second scaling factor, wherein a sum of the first scaling factor and the second scaling factor is less than or equal to one. For example, the maximum number of BD candidates that may be monitored for the type-1/type-2 USSs may then be equal to the value minus the number of BD candidates that are to be monitored for the CSS on the PCell/PSCell.

If it is determined, at 2012, that overbooking occurs, the operation flow/algorithmic structure 2000 may advance to selecting PDCCH BD candidates from a subset of type-1 and type-2 USS for monitoring based on a priority rule that 2016. The priority rule may be configured by RRC signaling as part of the search space configuration or it may be predefined in a 3GPP TS. In some embodiments, a USS that is actively being monitored may be the prioritized USS. Within a particular USS type, the search space sets may be prioritized based on their index, with a lower index being associated with a higher priority. When overbooking occurs, the UE may exclude BD candidates from as many of the lowest priority USSs needed to prevent the overbooking condition.

If it is determined, at 2012, that overbooking does not occur, the operation flow/algorithmic structure 2000 may advance to selecting PDCCH BD candidates from all the type-1 and type-2 USSs for monitoring at 2020.

Following 2016 or 2020, the operation flow/algorithmic structure may advance to monitoring the selected PDCCH BD candidates.

Figure 21:
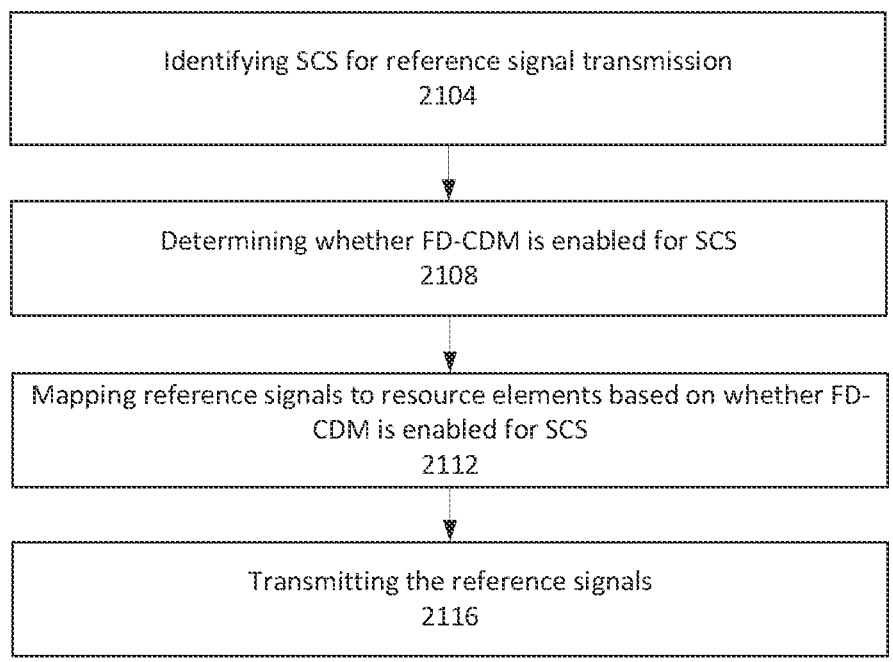
FIG. 21 illustrates another operational flow/algorithmic structure in accordance with some embodiments.

FIG. 21 illustrates an operation flow/algorithmic structure 2100 in accordance with some embodiments. The operation flow/algorithmic structure 2100 may be performed or implemented by a base station such as, for example, base station 108, 112, or 2300; or components thereof, for example, baseband processor 2304A.

The operation flow/algorithmic structure 2100 may include, at 2104, identifying an SCS for reference signal transmission. The SCS may be a 120 kHZ SCS, 480 kHZ SCS, a 960 kHZ SCS, or some other SCS.

The operation flow/algorithmic structure 2100 may further include, at 2108, determining whether FD-CDM is enabled for the identified SCS. FD-CDM may be disabled for higher SCS configurations, for example, 480 kHZ SCS or 960 kHZ SCS or based on channel conditions.

The operation flow/algorithmic structure 2100 may further include, at 2112, mapping reference signals to resource elements based on whether FD-CDM is enabled for the identified SCS. The mapping of the reference signals to the resource elements may be similar to that described above with respect to FIGS. 16-19.

The operation flow/algorithmic structure 2100 may further include, at 2116, transmitting the reference signals.

In some embodiments, the base station may provide a UE with an indication of whether FD-CDM is enabled for an SCS. This may be through the scheduling (or some other) DCI, system information, RRC signaling, MAC CE, or some combination thereof.

Figure 22:
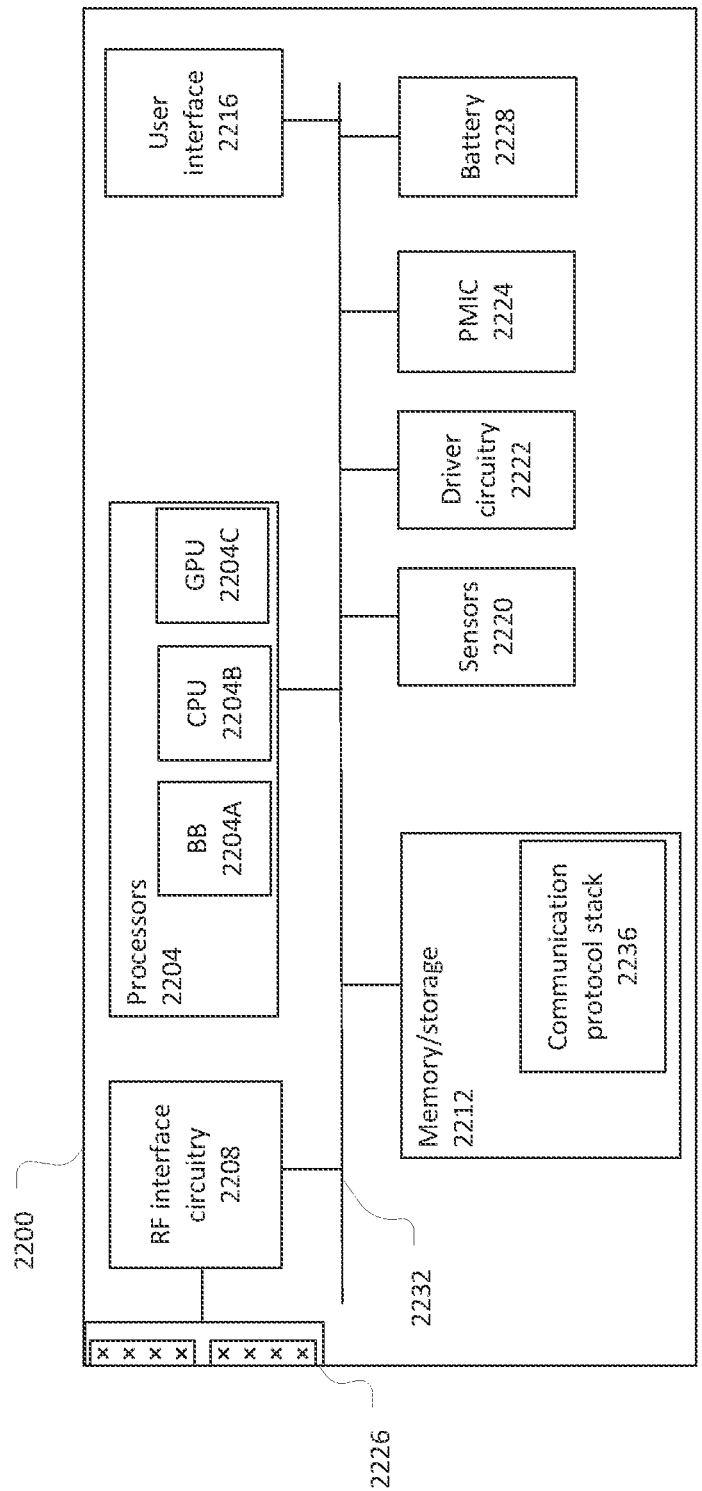
FIG. 22 illustrates a user equipment in accordance with some embodiments.

FIG. 22 illustrates a UE 2200 in accordance with some embodiments. The UE 2200 may be similar to and substantially interchangeable with UE 104 of FIG. 1.

The UE 2200 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), Internet-of-things devices.

The UE 2200 may include processors 2204, RF interface circuitry 2208, memory/storage 2212, user interface 2216, sensors 2220, driver circuitry 2222, power management integrated circuit (PMIC) 2224, antenna structure 2226, and battery 2228. The components of the UE 2200 may be implemented as integrated circuits (ICs), portions thereof, discrete electronic devices, or other modules, logic, hardware, software, firmware, or a combination thereof. The block diagram of FIG. 22 is intended to show a high-level view of some of the components of the UE 2200. However, some of the components shown may be omitted, additional components may be present, and different arrangement of the components shown may occur in other implementations.

The components of the UE 2200 may be coupled with various other components over one or more interconnects 2232, which may represent any type of interface, input/output, bus (local, system, or expansion), transmission line, trace, optical connection, etc. that allows various circuit components (on common or different chips or chipsets) to interact with one another.

The processors 2204 may include processor circuitry such as, for example, baseband processor circuitry (BB) 2204A, central processor unit circuitry (CPU) 2204B, and graphics processor unit circuitry (GPU) 2204C. The processors 2204 may include any type of circuitry or processor circuitry that executes or otherwise operates computer-executable instructions, such as program code, software modules, or functional processes from memory/storage 2212 to cause the UE 2200 to perform operations as described herein.

In some embodiments, the baseband processor circuitry 2204A may access a communication protocol stack 2236 in the memory/storage 2212 to communicate over a 3GPP compatible network. In general, the baseband processor circuitry 2204A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 2208.

The baseband processor circuitry 2204A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 2212 may include one or more non-transitory, computer-readable media that includes instructions (for example, communication protocol stack 2236) that may be executed by one or more of the processors 2204 to cause the UE 2200 to perform various operations described herein. The memory/storage 2212 include any type of volatile or non-volatile memory that may be distributed throughout the UE 2200. In some embodiments, some of the memory/storage 2212 may be located on the processors 2204 themselves (for example, L1 and L2 cache), while other memory/storage 2212 is external to the processors 2204 but accessible thereto via a memory interface. The memory/storage 2212 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 2208 may include transceiver circuitry and radio frequency front module (RFEM) that allows the UE 2200 to communicate with other devices over a radio access network. The RF interface circuitry 2208 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 2226 and proceed to filter and amplify (with a low-noise amplifier) the signal. The signal may be provided to a receiver of the transceiver that down-converts the RF signal into a baseband signal that is provided to the baseband processor of the processors 2204.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 2226.

In various embodiments, the RF interface circuitry 2208 may be configured to transmit/receive signals in a manner compatible with NR access technologies.

The antenna 2226 may include antenna elements to convert electrical signals into radio waves to travel through the air and to convert received radio waves into electrical signals. The antenna elements may be arranged into one or more antenna panels. The antenna 2226 may have antenna panels that are omnidirectional, directional, or a combination thereof to enable beamforming and multiple input, multiple output communications. The antenna 2226 may include microstrip antennas, printed antennas fabricated on the surface of one or more printed circuit boards, patch antennas, phased array antennas, etc. The antenna 2226 may have one or more panels designed for specific frequency bands including bands in FR1 or FR2.

The user interface circuitry 2216 includes various input/output (I/O) devices designed to enable user interaction with the UE 2200. The user interface 2216 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 2200.

The sensors 2220 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 2222 may include software and hardware elements that operate to control particular devices that are embedded in the UE 2200, attached to the UE 1100, or otherwise communicatively coupled with the UE 2200. The driver circuitry 2222 may include individual drivers allowing other components to interact with or control various input/output (I/O) devices that may be present within, or connected to, the UE 2200. For example, driver circuitry 2222 may include a display driver to control and allow access to a display device, a touchscreen driver to control and allow access to a touchscreen interface, sensor drivers to obtain sensor readings of sensor circuitry 2220 and control and allow access to sensor circuitry 2220, drivers to obtain actuator positions of electro-mechanic components or control and allow access to the electro-mechanic components, a camera driver to control and allow access to an embedded image capture device, audio drivers to control and allow access to one or more audio devices.

The PMIC 2224 may manage power provided to various components of the UE 2200. In particular, with respect to the processors 2204, the PMIC 2224 may control power-source selection, voltage scaling, battery charging, or DC-to-DC conversion.

In some embodiments, the PMIC 2224 may control, or otherwise be part of, various power saving mechanisms of the UE 2200 including DRX as discussed herein.

A battery 2228 may power the UE 2200, although in some examples the UE 2200 may be mounted deployed in a fixed location, and may have a power supply coupled to an electrical grid. The battery 2228 may be a lithium ion battery, a metal-air battery, such as a zinc-air battery, an aluminum-air battery, a lithium-air battery, and the like. In some implementations, such as in vehicle-based applications, the battery 2228 may be a typical lead-acid automotive battery.

Figure 23:
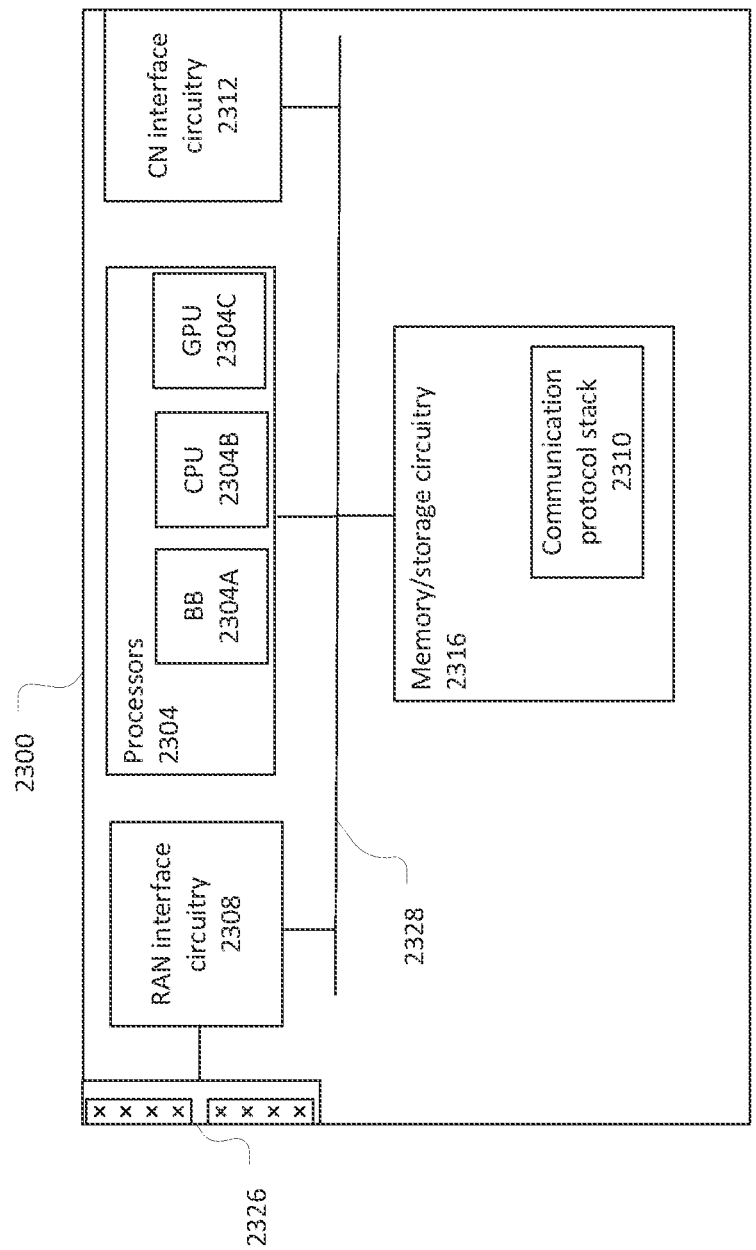
FIG. 23 illustrates a base station in accordance with some embodiments.

FIG. 23 illustrates a base station 2300 in accordance with some embodiments. The base station 2300 may be similar to and substantially interchangeable with base station 108 or 112 of FIG. 1.

The base station 2300 may include processors 2304, RF interface circuitry 2308, core network (CN) interface circuitry 2312, memory/storage circuitry 2316, and antenna structure 2326.

The components of the base station 2300 may be coupled with various other components over one or more interconnects 2328.

The processors 2304, RF interface circuitry 2308, memory/storage circuitry 2316 (including communication protocol stack 2310), antenna structure 2326, and interconnects 2328 may be similar to like-named elements shown and described with respect to FIG. 10.

The CN interface circuitry 2312 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the base station 2300 via a fiber optic or wireless backhaul. The CN interface circuitry 2312 may include one or more dedicated processors or FPGAs to communicate using one or more of the aforementioned protocols. In some implementations, the CN interface circuitry 2312 may include multiple controllers to provide connectivity to other networks using the same or different protocols.

In some embodiments, the base station 2300 may be coupled with transmit receive points (TRPs) using the antenna structure 2326, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a base station, the method comprising: configuring a first type user equipment (UE)-specific search space (USS) on a primary serving cell (PCell) or a primary secondary cell (PSCell) for scheduling data in the PCell or PSCell; and configuring a second type USS on a scheduling secondary cell (sSCell) for scheduling data in the PCell or the PSCell, wherein the first type USS and the second type USS are configured with a same search space set (SSS) identifier (ID) and identical configuration parameters.

Example 2 includes the method of example 1 or some other example herein, wherein the identical configuration parameters include a physical downlink control channel (PDCCH) monitoring periodicity and offset or PDCCH monitoring span within a slot.

Example 3 includes method of example 1 or some other example herein, wherein the identical configuration parameters fully align monitoring occasions for the first type USS and the second type USS in a time domain.

Example 4 includes the method of example 1 or some other example herein, wherein configuring the first type USS and the second type USS comprises: transmitting, to a user equipment (UE), a radio resource control (RRC) signal to configure a first one of the first type USS or the second type USS, wherein the RRC signal includes a flag to indicate presence of a second one of the first type USS or the second type USS that is associated with the first one.

Example 5 includes a method of operating a user equipment (UE), the method comprising: receiving configuration information to configure a first UE-specific search space (USS), the first USS being a first one of: a first type USS configured on a primary serving cell (PCell) or a primary secondary cell (PSCell) for scheduling data in the PCell or PSCell; or a second type USS on a scheduling secondary cell (sSCell) for scheduling data in the PCell or the PSCell; determining, based on the configuration information, a configuration of a second USS, the second USS being a second one of the first type USS or the second type USS.

Example 6 includes method of example 5 or some other example herein, wherein the configuration information includes a flag to indicate a presence of the second USS.

Example 7 includes the method of example 5 or some other example herein, wherein the first USS is a default USS and the second USS is a non-default USS, and the method further comprises: determining whether a triggering condition is present; if the triggering condition is not present, monitoring the default USS for downlink control information; and if the triggering condition is present, monitoring the non-default USS for downlink control information.

Example 8 includes the method of example 7 or some other example herein, further comprising: determining the triggering condition is present when the default USS is in an uplink slot.

Example 9 includes the method of example 7 or some other example herein, further comprising: detecting a physical downlink control channel (PDCCH) transmission in the default USS of a first slot, the PDCCH transmission to include a flag; and determining, based on the flag, that the triggering condition is present one or more symbols after a last symbol of the PDCCH transmission.

Example 10 includes the method of example 9 or some other example herein, wherein the PDCCH transmission includes downlink control information (DCI) and the flag is: a sequence used to scramble cyclic redundancy check (CRC) bits of the DCI; or one or more bits in a field of the DCI.

Example 11 includes the method of example 7 or some other example herein, further comprising: determining that the triggering condition is present; setting a timer based on said determining that the triggering condition is present; and determining that the triggering condition is no longer present upon expiration of the timer.

Example 12 includes the method of example 7 or some other example herein, further comprising: detecting downlink control information (DCI) in a common search space, the DCI to include a flag; and determining that the triggering condition is present based on the flag.

Example 13 includes the method of example 12 or some other example herein, further comprising: receiving, by radio resource control (RRC) or media access control (MAC) signaling, an indication of a field index; and detecting the flag in the DCI based on the field index.

Example 14 includes the method of example 12 or some other example herein, wherein the DCI comprises DCI format 2_6 received in discontinuous reception (DRX) active time.

Example 15 includes a method of operating a user equipment (UE), the method comprising: determining a maximum number of blind decoding (BD) candidates for a primary serving cell (PCell) or primary secondary serving cell (PSCell); determining a number of physical downlink control channel (PDCCH) BD candidates that are to be monitored for a type-1 UE-specific search space (USS) and a type-2 USS, wherein the type-1 USS is configured on a scheduling secondary cell (sSCell) for scheduling data in the PCell or the PScell and the type-2 USS is configured on the PCell or PSCell for scheduling data on the PCell or PSCell; and determining whether overbooking occurs based on the maximum number of BD candidates and the number of PDCCH BD candidates that are to be monitored for the type-1 USS and the type-2 USS.

Example 16 includes the method of example 15 or some other example herein, wherein the PCell or the PSCell is configured with a first subcarrier spacing (SCS), the sSCell is configured with a second subcarrier spacing (SCS), and the method further comprising: determining the maximum number of BD candidates based on a lower SCS of the first and second SCSs.

Example 17 includes the method of example 15 or some other example herein, wherein the maximum number is a first maximum number and the method further comprising: determining a second maximum number of BD candidates for the sSCell; and determining a third maximum number of BD candidates for a virtual component carrier based on a sum of the first maximum number multiplied by a first scaling factor and the second maximum number multiplied by a second scaling factor, wherein the first scaling factor plus the second scaling factor is less than or equal to one.

Example 18 include the user equipment of example 15 or some other example herein, further comprising: determining PDCCH overbooking is not allowed for PDCCH monitoring for the sSCell; determining PDCCH overbooking is not allowed for a common search space on the PCell or PSCell; or determining PDCCH overbooking is not allowed for type-1 USS or type 2 USS.

Example 19 includes the method of example 15 or some other example herein, wherein the method further comprises: determining a number of PDCCH candidates that are available for type-1 USS and type-2 USS without overbooking by subtracting a number of PDCCH BD candidates that are to be monitored for a common search space (CSS) from the maximum number of BD candidates for the PCell or the PSCell.

Example 20 includes the method of example 19 or some other example herein, wherein determining whether overbooking occurs comprises: determining that overbooking occurs based on a determination that a first value is greater than the number of PDCCH candidates that are available for type-1 USS and type-2 USS without overbooking, wherein the first value comprises: the number of PDCCH BD candidates that are to be monitored for the type-1 CSS and the type-2 CSS; a number of PDCCH BD candidates that are to be monitored for the type-1 CSS plus a number of PDCCH BD candidates that are to be monitored for the type-2 CSS multiplied by a scaling factor; a number of PDCCH BD candidates that are to be monitored for the type-2 CSS plus a number of PDCCH BD candidates that are to be monitored for the type-1 CSS multiplied by a scaling factor; a scaling factor multiplied by the number of PDCCH BD candidates that are to be monitored for the type-1 CSS and the type-2 CSS; or a maximum value selected from a number of PDCCH BD candidates that are to be monitored for the type-1 CSS and a number of PDCCH BD candidates that are to be monitored for the type-2 CSS.

Example 21 includes the method of example 15 or some other example herein, further comprising: determining that overbooking occurs; and selecting, based on said determining that overbooking occurs, one or more PDCCH BD candidates to not monitor based on a priority rule.

Example 22 includes the method of example 21 or some other example herein, wherein the priority rule is configured by radio resource control signaling or is predefined.

Example 23 includes the method of example 21 or some other example herein, wherein the priority rule: prioritizes PDCCH BD candidates that are to be monitored for type-2 USS over PDCCH BD candidates that are to be monitored for type-1 USS; prioritizes PDCCH BD candidates that are to be monitored for whichever of type-1 USS or type-2 USS is actively monitored by the UE over PDCCH BD candidates that are to be monitored for whichever of type-1 USS or type-2 USS that is not actively monitored by the UE.

Example 24 includes the method of example 21 or some other example herein, wherein the priority rule: prioritizes PDCCH BD candidates of a first type of USS that have a relatively lower index over PDCCH BD candidates of the first type of USS that have a relatively higher index, wherein the first type is type-1 USS or type-2 USS.

Example 25 includes a method of operating a base station, the method comprising: identifying a subcarrier spacing (SCS) for reference signal transmission; determining whether frequency domain (FD)-code division multiplexing (CDM) is enabled for the SCS; mapping reference signals to resource elements based on whether FD-CDM is enabled; and transmitting the reference signals.

Example 26 includes the method of example 25 or some other example herein, wherein the reference signals are demodulation reference signals or channel state information-reference signals.

Example 27 includes the method of example 25 or some other example herein, further comprising: accessing predefined SCS configuration information; and determining whether FD-CDM is enabled for the SCS based on the predefined SCS configuration information.

Example 28 includes the method of example 27 or some other example herein, wherein the SCS configuration information is to indicate that FD-CDM is disabled for a set of SCS configurations that include SCS configurations with 480 kilohertz (KHz) or 960 KHz SCS.

Example 29 includes the method of example 25 or some other example herein, further comprising: transmitting SCS configuration information in system information message or radio resource control (RRC) signaling, the SCS configuration information to indicate whether FD-CDM is enabled for the SCS.

Example 30 includes the method of example 25 or some other example herein, further comprising: transmitting SCS configuration information in bitmap of a media access control (MAC) control element (CE) the bitmap to include a value that corresponds to the SCS and indicates whether FD-CDM is enabled for the SCS.

Example 31 includes the method of example 25 or some other example herein, further comprising: transmitting downlink control information (DCI) with an indication of whether FD-CDM is enabled for the SCS, wherein the indication is a sequence used to scramble cyclic redundancy check (CRC) bits of the DCI or one or more bits in a field of the DCI.

Example 32 includes the method of example 25 or some other example herein, further comprising: transmitting downlink control information (DCI) that includes a demodulation reference signal (DMRS) antenna port indication that references a first table if FD-CDM is enabled or a second table if FD-CDM is not enabled, wherein the first table is larger than the second table.

Example 33 includes the method of example 32 or some other example herein, wherein the second table includes only leading antenna ports.

Example 34 includes a method of operating a user equipment (UE), the method comprising: mapping a demodulation reference signal (DMRS) sequence associated with a single DMRS port to consecutive resource elements in frequency domain; and transmitting the DMRS sequence.

Example 35 includes the method of example 34 or some other example herein, further comprising: transmitting the DMRS sequence with frequency domain-code division multiplexing (FD-CDM).

Example 36 includes the method of example 34 or some other example herein, further comprising: mapping DMRS sequences associated with different DMRS ports to consecutive resource elements in time domain using orthogonal cover codes, and transmitting the DMRS sequences.

Example 37 includes the method of example 34 or some other example herein, further comprising: transmitting four layers of data associated with the DMRS sequences.

Example 38 includes a method of operating a user equipment (UE), the method comprising: mapping demodulation reference signal (DMRS) sequences to resource elements across paired DMRS occasions; and transmitting the DMRS sequences.

Example 39 includes the method of example 38 or some other example herein, wherein mapping the DMRS sequences comprises: mapping DMRS sequences associated with first and second antenna ports to first resource elements in a first DMRS occasion of the paired DMRS occasions and to second resource elements in a second DMRS occasion of the paired DMRS occasions, wherein the first resource elements are adjacent in a time domain, the second resource elements are adjacent in time domain, and the second resource elements are offset from the first resource elements in frequency domain from the first resource elements.

Example 40 includes the method of example 39 or some other example herein, wherein the second resource elements are offset by two subcarriers.

Example 41 includes the method of example 39 or some other example herein, further comprising: encoding the DMRS sequences mapped to the first resource elements and the DMRS sequences mapped to the second resource elements with a first pair of orthogonal cover codes.

Example 42 includes the method of example 39 or some other example herein, further comprising: determining a length of a data duration in a symbol; determining a physical data shared channel (PDSCH) mapping type; and determining a time domain separation between the first DMRS occasion and the second DMRS occasion based on the length and the PDSCH mapping type.

Example 43 includes the method of example 39 or some other example herein, further comprising: detecting downlink control information (DCI) to schedule a first physical downlink shared channel (PDSCH) and a second PDSCH, wherein the second PDSCH is consecutive with the first PDSCH in a time domain and the first resource elements are in a first two symbols of the first PDSCH and the second resource elements are in a first two symbols of the second PDSCH.

Example 44 may include an apparatus comprising means to perform one or more elements of a method described in or related to any of examples 1-43, or any other method or process described herein.

Example 45 may include one or more non-transitory computer-readable media comprising instructions to cause an electronic device, upon execution of the instructions by one or more processors of the electronic device, to perform one or more elements of a method described in or related to any of examples 1-43, or any other method or process described herein.

Example 46 may include an apparatus comprising logic, modules, or circuitry to perform one or more elements of a method described in or related to any of examples 1-43, or any other method or process described herein.

Example 47 may include a method, technique, or process as described in or related to any of examples 1-43, or portions or parts thereof.

Example 48 may include an apparatus comprising: one or more processors and one or more computer-readable media comprising instructions that, when executed by the one or more processors, cause the one or more processors to perform the method, techniques, or process as described in or related to any of examples 1-43, or portions thereof.

Example 49 may include a signal as described in or related to any of examples 1-43, or portions or parts thereof.

Example 50 may include a datagram, information element, packet, frame, segment, PDU, or message as described in or related to any of examples 1-43, or portions or parts thereof, or otherwise described in the present disclosure.

Example 51 may include a signal encoded with data as described in or related to any of examples 1-43, or portions or parts thereof, or otherwise described in the present disclosure.

Example 52 may include a signal encoded with a datagram, IE, packet, frame, segment, PDU, or message as described in or related to any of examples 1-43, or portions or parts thereof, or otherwise described in the present disclosure.

Example 53 may include an electromagnetic signal carrying computer-readable instructions, wherein execution of the computer-readable instructions by one or more processors is to cause the one or more processors to perform the method, techniques, or process as described in or related to any of examples 1-43, or portions thereof.

Example 54 may include a computer program comprising instructions, wherein execution of the program by a processing element is to cause the processing element to carry out the method, techniques, or process as described in or related to any of examples 1-43, or portions thereof.

Example 55 may include a signal in a wireless network as shown and described herein.

Example 56 may include a method of communicating in a wireless network as shown and described herein.

Example 57 may include a system for providing wireless communication as shown and described herein.

Example 58 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications w % ill become apparent to those skilled in the art once the above disclosure is fully appreciated. It is intended that the following claims be interpreted to embrace all such variations and modifications.

What is claimed is:

1. A method comprising:
configuring a first type user equipment (UE)-specific search space (USS) on a primary serving cell (PCell) or a primary secondary cell (PSCell) for scheduling data in the PCell or PSCell; and
configuring a second type USS on a scheduling secondary cell (sSCell) for scheduling data in the PCell or the PSCell, wherein the first type USS and the second type USS are configured with a same search space set (SSS) identifier (ID) and identical configuration parameters.

2. The method of claim 1, wherein the identical configuration parameters include a physical downlink control channel (PDCCH) monitoring periodicity and offset or PDCCH monitoring span within a slot.

3. The method of claim 1, wherein the identical configuration parameters fully align monitoring occasions for the first type USS and the second type USS in a time domain.

4. The method of claim 1, wherein configuring the first type USS and the second type USS comprises:
transmitting, to a user equipment (UE), a radio resource control (RRC) signal to configure a first one of the first type USS or the second type USS, wherein the RRC signal includes a flag to indicate presence of a second one of the first type USS or the second type USS that is associated with the first one.

5. One or more non-transitory computer-readable media having instructions that, when executed, cause processing circuitry to:
receive configuration information to configure a first user equipment (UE)-specific search space (USS), the first USS being a first one of: first type USS configured on a primary serving cell (PCell) or a primary secondary cell (PSCell) for scheduling data in the PCell or PSCell; or a second type USS on a scheduling secondary cell (sSCell) for scheduling data in the PCell or the PSCell; and
determine, based on the configuration information, a configuration of a second USS, the second USS being a second one of the first type USS or the second type USS.

6. The one or more non-transitory computer-readable media of claim 5, wherein the configuration information includes a flag to indicate a presence of the second USS.

7. The one or more non-transitory computer-readable media of claim 5, wherein the first USS is a default USS and the second USS is a non-default USS, and the instructions, when executed, further cause the UE to:
determine whether a triggering condition is present;
if the triggering condition is not present, monitor the default USS for downlink control information; and
if the triggering condition is present, monitor the non-default USS for downlink control information.

8. The one or more non-transitory computer-readable media of claim 7, wherein the instructions, when executed, further cause the UE to:
determine the triggering condition is present when the default USS is in an uplink slot.

9. The one or more non-transitory computer-readable media of claim 7, wherein the instructions, when executed, further cause the UE to:
detect a physical downlink control channel (PDCCH) transmission in the default USS of a first slot, the PDCCH transmission to include a flag; and
determine, based on the flag, that the triggering condition is present one or more symbols after a last symbol of the PDCCH transmission.

10. The one or more non-transitory computer-readable media of claim 9, wherein the PDCCH transmission includes downlink control information (DCI) and the flag is: a sequence used to scramble cyclic redundancy check (CRC) bits of the DCI; or one or more bits in a field of the DCI.

11. The one or more non-transitory computer-readable media of claim 7, wherein the instructions, when executed, further cause the UE to:
determine that the triggering condition is present;
set a timer based on said determination that the triggering condition is present; and
determine that the triggering condition is no longer present upon expiration of the timer.

12. The one or more non-transitory computer-readable media of claim 7, wherein the instructions, when executed, further cause the UE to:
detect downlink control information (DCI) in a common search space, the DCI to include a flag; and
determine that the triggering condition is present based on the flag.

13. The one or more non-transitory computer-readable media of claim 12, wherein the instructions, when executed, further cause the UE to:
receive, by radio resource control (RRC) or media access control (MAC) signaling, an indication of a field index; and
detect the flag in the DCI based on the field index.

14. A device comprising:
memory to store search space configuration information; and
processing circuitry, coupled with the memory, the processing circuitry to:
determine a maximum number of blind decoding (BD) candidates for a primary serving cell (PCell) or primary secondary serving cell (PSCell);
determine, based on the search space configuration information, a number of physical downlink control channel (PDCCH) BD candidates that are to be monitored for a type-1 user equipment (UE)-specific search space (USS) and a type-2 USS, wherein the type-1 USS is configured on a scheduling secondary cell (sSCell) for scheduling data in the PCell or the PScell and the type-2 USS is configured on the PCell or PSCell for scheduling data on the PCell or PSCell; and
determine whether overbooking occurs based on the maximum number of BD candidates and the number of PDCCH BD candidates that are to be monitored for the type-1 USS and the type-2 USS.

15. The device of claim 14, wherein the PCell or the PSCell is configured with a first subcarrier spacing (SCS), the sSCell is configured with a second subcarrier spacing (SCS), and the processing circuitry is further to:
   determine the maximum number of BD candidates based on a lower SCS of the first and second SCSs.

16. The device of claim 14, wherein the maximum number is a first maximum number and the processing circuitry is further to:
   determine a second maximum number of BD candidates for the sSCell; and
   determine a third maximum number of BD candidates for a virtual component carrier based on a sum of the first maximum number multiplied by a first scaling factor and the second maximum number multiplied by a second scaling factor, wherein the first scaling factor plus the second scaling factor is less than or equal to one.

17. The device of claim 14, wherein the processing circuitry is further to:
   determine PDCCH overbooking is not allowed for PDCCH monitoring for the sSCell;
   determine PDCCH overbooking is not allowed for a common search space on the PCell or PSCell; or
   determine PDCCH overbooking is not allowed for type-1 USS or type 2 USS.

18. The device of claim 14, wherein the processing circuitry is further to:
   determine a number of PDCCH candidates that are available for type-1 USS and type-2 USS without overbooking by subtracting a number of PDCCH BD candidates that are to be monitored for a common search space (CSS) from the maximum number of BD candidates for the PCell or the PSCell.

19. The device of claim 18, wherein to determine whether overbooking occurs comprises:
   determine that overbooking occurs based on a determination that a first value is greater than the number of PDCCH candidates that are available for type-1 USS and type-2 USS without overbooking, wherein the first value comprises:
   a number of PDCCH BD candidates that are to be monitored for the type-1 USS and the type-2 USS;
   a number of PDCCH BD candidates that are to be monitored for the type-1 USS plus a number of PDCCH BD candidates that are to be monitored for the type-2 USS multiplied by a scaling factor;
   a number of PDCCH BD candidates that are to be monitored for the type-2 USS plus a number of PDCCH BD candidates that are to be monitored for the type-1 USS multiplied by a scaling factor;
   a scaling factor multiplied by the number of PDCCH BD candidates that are to be monitored for the type-1 USS and the type-2 USS; or
   a maximum value selected from a number of PDCCH BD candidates that are to be monitored for the type-1 USS and a number of PDCCH BD candidates that are to be monitored for the type-2 USS.

\* \* \* \* \*